US007984062B2

(12) United States Patent
Dunning et al.

(10) Patent No.: US 7,984,062 B2
(45) Date of Patent: Jul. 19, 2011

(54) ASSOCIATING AND LINKING COMPACT DISC METADATA

(75) Inventors: Ted E Dunning, San Diego, CA (US);
Bradley D Kindig, San Diego, CA (US);
Sean C Joshlin, San Marcos, CA (US);
Christopher P Archibald, Encinitas, CA (US)

(73) Assignee: Yahoo! Inc., Sunnyvale, CA (US)

( * ) Notice: Subject to any disclaimer, the term of this patent is extended or adjusted under 35 U.S.C. 154(b) by 134 days.

(21) Appl. No.: 12/480,228

(22) Filed: Jun. 8, 2009

(65) Prior Publication Data

US 2009/0307201 A1 Dec. 10, 2009

Related U.S. Application Data

(62) Division of application No. 10/406,799, filed on Apr. 2, 2003, now Pat. No. 7,707,221.

(60) Provisional application No. 60/369,890, filed on Apr. 3, 2002.

(51) Int. Cl.
*G06F 17/30* (2006.01)
*G06F 7/00* (2006.01)

(52) U.S. Cl. ........ 707/766; 707/770; 707/773; 707/774; 707/775

(58) Field of Classification Search ........................ None
See application file for complete search history.

(56) References Cited

U.S. PATENT DOCUMENTS

| 7,028,050 | B1 * | 4/2006 | Rose ..................................... 1/1 |
| 7,277,766 | B1 * | 10/2007 | Khan et al. ...................... 700/94 |
| 2002/0099697 | A1 * | 7/2002 | Jensen-Grey .................... 707/3 |
| 2003/0195863 | A1 * | 10/2003 | Marsh .............................. 707/1 |

\* cited by examiner

*Primary Examiner* — Tim T. Vo
*Assistant Examiner* — Sangwoo Ahn
(74) *Attorney, Agent, or Firm* — James J. DeCarlo; Greenberg Traurig, LLP

(57) ABSTRACT

Improved techniques for enhancing, associating, and linking various sources of metadata for music files, to allow integration of commercially generated metadata with user-entered metadata, and to ensure that metadata provided to the user is of the highest quality and accuracy available, even when the metadata comes from disparate sources having different levels of credibility. The invention further provides improved techniques for identifying approximate matches when querying metadata databases, and also provides improved techniques for accepting user submissions of metadata, for categorizing user submissions according to relative credibility, and for integrating user submissions with existing metadata.

3 Claims, 25 Drawing Sheets

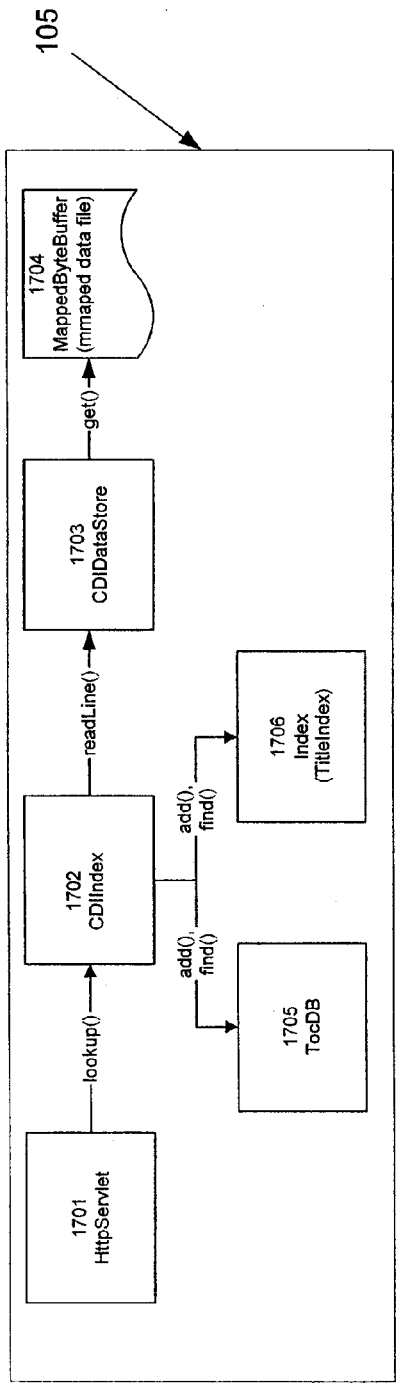
*FIG. 17A*
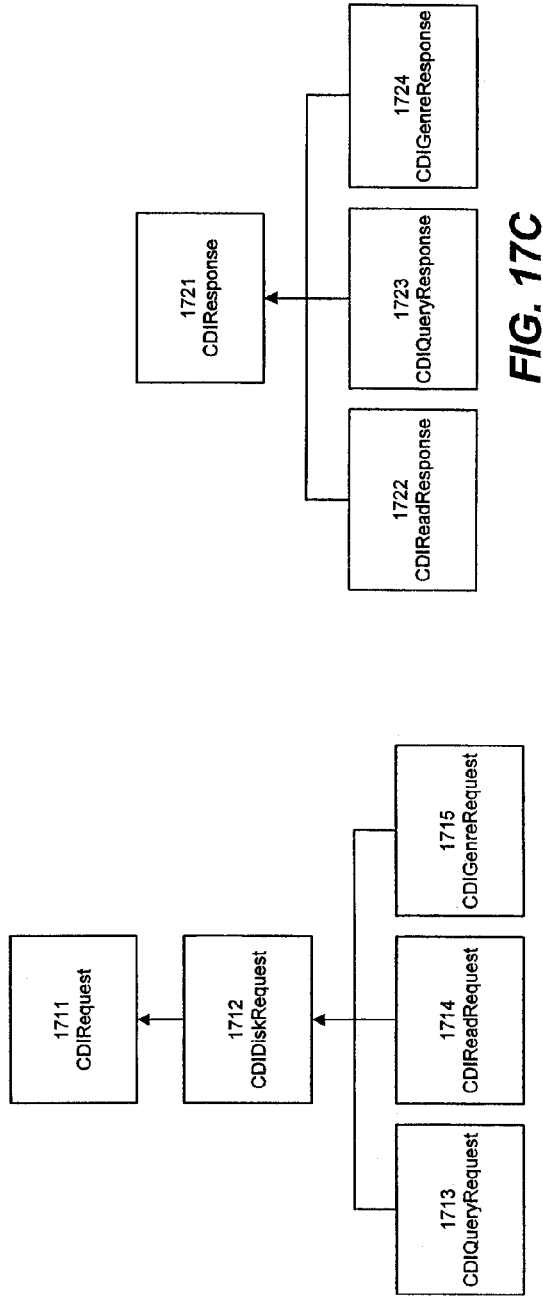
*FIG. 17C*
*FIG. 17B*

ASSOCIATING AND LINKING COMPACT DISC METADATA

CROSS-REFERENCE TO RELATED APPLICATIONS

The present application is a divisional of Application No. 10/406,799, filed Apr. 2, 2003, now U.S. Pat. No. 7,707,221 which claims the benefit of U.S. Provisional Patent Application Ser. No. 60/369,890, filed Apr. 3, 2002, the entire contents of both of which are incorporated herein by reference.

The present application is related to U.S. patent application Ser. No. 10/167,807 for "Music Information Retrieval," filed Jun. 11, 2002, the disclosure of which is incorporated herein by reference.

BACKGROUND OF THE INVENTION

1. Field of the Invention

The present invention relates generally to playing, copying, and managing music files, such as those found on compact discs (CDs), and more particularly to techniques for retrieving, associating, and linking various sources of metadata for the music files.

2. Description of the Background Art

Most audio CDs contain only digital music and a table of contents that tells the player how many tracks are present, the length of each track, and where on the disc each track starts. In general, audio CDs do not carry "metadata" such as the title of the album, the artist that recorded it, and the names of the songs or tracks contained on it.

Metadata is of value when playing, copying, and managing music files. Metadata includes descriptive information about music tracks and albums, so as to allow users to more easily identify files. For example, if a song title is available as metadata, an audio CD player can look up additional information from a web server, and can display artist name, album title, and song title while a track is being played. The user can view the contents of the CD by track name and select the tracks by name for random access playback. If a user makes a copy of a music file from a CD (a process known as "ripping"), or downloads a music file from an online source, metadata can be used as a default filename. Metadata is also useful in organizing and categorizing a collection of files, for example by artist name or musical genre; metadata can also be used as an identifier for gaining access to additional information about a song, artist, or CD.

Existing music players and CD management ("ripper") software applications that make use of available metadata include, for example:

Real Jukebox, available and CD from RealNetworks, Inc. of Seattle, Wash.;

Winamp, available from Nullsoft, Inc., a division of America Online, Inc., of Dulles, Va.;

Easy CD Creator 5, available from Roxio, Inc. of Santa Clara, Calif.;

KDE CD Player for Linux; and

Toast, available from Roxio, Inc. of Santa Clara, Calif.

Conventionally, since CDs themselves do not generally carry metadata, some music client software applications (including players and CD management software) obtain metadata from external sources. For example, in some software applications users enter metadata manually, and the entered metadata is then associated with some unique characteristics of a CD (such as track lengths), so that the entered metadata can later be accessed whenever the CD is re-inserted in the user's computer. Alternatively, the client software can obtain metadata from a central server that is run by an application service provider (ASP). Such functionality is provided, for example, by CDDB, available from Gracenote of Berkeley, Calif., or by FreeDB, available at "http://www.freedb.org". The Windows Media Player client, available from Microsoft Corporation of Redmond, Wash., also communicates with a CD Metadata ASP to obtain metadata.

FIG. 1 depicts a system for obtaining metadata from a remote server according to the prior art. An end user of client software 102 (such as a music player or ripper application) inserts CD 101 in a connected CD drive (not shown). Client software 102 requests that metadata client module 104 identify CD 101 and return the metadata for use by software 102. Client module 104 may derive a Disc ID from available information from CD 101, such as table of contents (TOC). Module 104 then sends the Disc ID over a network connection to a remote metadata ASP 103. The request is typically sent over the Internet using Hypertext Transfer Protocol (HTTP) as a transmission protocol. Metadata server 105 receives the request and runs a query on metadata database 106 to find a metadata record that matches the Disc ID. Database 106 provides the metadata, which is then transmitted back to module 104. Module 104 makes the data available to software 102.

Existing systems such as CDDB and FreeDB create the metadata database from input provided by users of the system. If, when a CD is inserted, no matching metadata is found, software 102 prompts the user to enter the metadata manually. The user-entered metadata is then transmitted back to Metadata ASP 103 and is added to database 106 and associated with a new disc identifier for the inserted CD.

FIG. 2 depicts this method in more detail, as generally performed by metadata client 104 according to the prior art. Client 104 extracts 201 Disc IDs from the CD TOC data. Client 104 then transmits 202 the Disc IDs to metadata server 105. If server 105 indicates 203 that matching metadata was found in database 106, the metadata is made available 206 to client software 102. If server 105 indicates 203 that no match was found, client 104 prompts the user 202 to enter the missing metadata. Once the user has provided the metadata, client 104 transmits 205 the metadata to server 105, which saves the metadata in database 106. The metadata is made available 206 to client software 102.

FIG. 3 depicts a server method of obtaining metadata according to the prior art. Server 105 receives a request 301 for metadata from client 104 over HTTP or some other protocol. Server 105 looks up 302 the Disc ID in metadata database 106. If a match exists 303, server 105 returns 304 the metadata for the match to client 104, along with status indicating a match 304. Otherwise, server 105 returns a status code indicating that no matches were found.

Existing systems do not provide a mechanism for linking metadata from two or more sources. Thus, if metadata is available from some external source, such as a commercially developed third-party database of music information, existing systems are not generally able to integrate such external metadata with the above-described scheme. In general, then, prior art metadata systems do not take advantage of the availability of more accurate and/or more complete information that may be available from a variety of sources. Furthermore, existing systems do not provide a mechanism for establishing links between metadata records in disparate databases, nor do they allow for management of various data sources having different levels of credibility.

SUMMARY OF THE INVENTION

The present invention includes techniques for enhancing, associating, and linking various sources of metadata for music files, thus allowing integration of commercially generated metadata with user-entered metadata. The invention provides mechanisms for ensuring that metadata provided to the user is of the highest quality and accuracy available, even when the metadata comes from disparate sources having different levels of credibility. Using the techniques of the invention, redundancies among various data sources can be resolved, and inaccuracies can be corrected. The invention therefore enriches the set of album metadata that is available to the ripping and playback features when interacting with an audio CD.

In one embodiment, as described below, the invention utilizes professional quality metadata from a commercial database when such data is available. If such metadata is not available, the invention falls back on user-entered data. As described in more detail below, the invention generates and maintains a linking database allowing records from two or more metadata databases to be linked. The linking database also stores learned relationships among records from disparate databases, so that future queries can be serviced from the data source having the highest degree of credibility.

In one embodiment, the present invention provides improved techniques for identifying approximate matches, when querying metadata databases. In this manner, the present invention is able to detect matches even in the presence of slight variations in TOC data or other identifying data.

The present invention further provides improved techniques for accepting user submissions of metadata, for categorizing user submissions according to relative credibility, and for integrating user submissions with existing metadata.

BRIEF DESCRIPTION OF THE DRAWINGS

FIGS. 17A, 17B, and 17C are diagrams depicting the software structure of a metadata server according to one embodiment of the present invention.

DETAILED DESCRIPTION OF A PREFERRED EMBODIMENT

The following description of system components and operation is merely exemplary of embodiments of the present invention. One skilled in the art will recognize that the various designs, implementations, and techniques described herein may be used alone or in any combination, and that many modifications and equivalent arrangements can be used. Accordingly, the following description is presented for purposes of illustration, and is not intended to limit the invention to the precise forms disclosed.

In particular, in the following description, the present invention is set forth in the context of a client software application, running on a personal computer, for playing music from a CD. The client software application communicates with a server over a network, using established network protocols. One skilled in the art will recognize, however, that the present invention can be implemented in other environments and contexts. For example, the invention may be implemented in a CD player, consumer electronics product, personal digital assistant (PDA), cell phone, or other device. The invention may be implemented independently of playback of a CD. Furthermore, the invention is not limited to operation with CD-based music; the metadata that is retrieved, processed, and updated by the present invention can be descriptive of music, audio, video, multimedia, or any other type of data, and it can be stored on or retrieved from any medium, including without limitation tapes, discs, mini-discs, hard drives, servers, digital versatile discs (DVDs), and the like.

In one embodiment, the system of the present invention utilizes professional quality metadata from a commercial database when such data is available. If such metadata is not available, the invention falls back on user-entered data. In alternative embodiments, any number of databases or metadata sources are made available according to a hierarchical scheme. The retrieval techniques of the present invention select appropriate sources for metadata according to relative credibility, availability, and completeness of each source. Furthermore, in one embodiment, the present invention provides mechanisms for linking records in disparate metadata sources, so that the sources can be integrated to provide more complete data in an efficient manner.

Vector Matching

Figure 6:
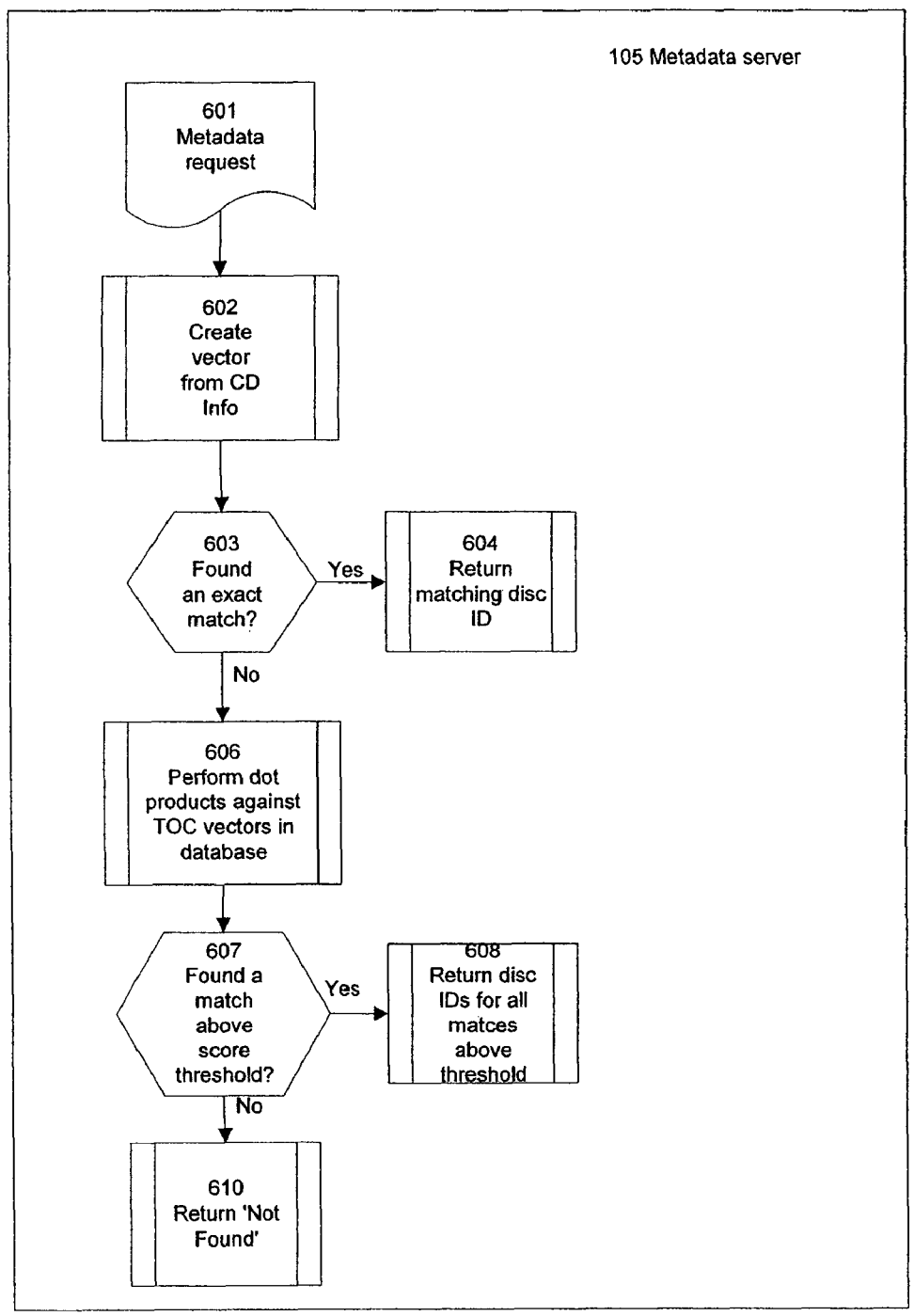
FIG. 6 is a flowchart depicting an improved server method for vector matching according to one embodiment of the present invention.

In one embodiment, the invention matches TOC-based queries to entries in a metadata database 106 using fixed-dimension vectors containing track length information. Referring now to FIG. 6, there is shown a method for vector matching according to one embodiment of the present invention. Exact and/or approximate matching techniques may be used. Exact matching techniques find identical vectors. Approximate matching techniques determine differences between vectors, employing cosine matching (measuring the angle between vectors), difference matching (measuring the magnitude of the difference between vectors), or the like to determine which vectors are most closely aligned with one another.

The system of the invention formulates a vector based on information that can be read from the CD. For example, in one embodiment, client software 102 reads TOC data from the CD, and client module 104 formulates a vector from the track lengths derived from the TOC data. In another embodiment, client module 104 transmits the TOC data to server 105, which then formulates the vector.

Once metadata request 601 is received, the system of the invention creates 602 a vector using information from request 601 such as TOC data. The vector is formulated, for example, by calculating the length of each track in frames. This may be done by subtracting the start offset of the track from the start offset of the following track. For example, in the following excerpt from a TOC-based query, where the first number denotes the number of tracks or segments on the media and the subsequent numbers represent the starting offsets (in media units) of each track or segment:

16+22+150+25046+40960+55582+74952+90015+
114823+131009+142311+157817+173768+196309+217677+
231408+240533+252548+260507+274838+292015+305962+
322830+339361+4752, the lengths are 24896, 15914, 14622, 19370, 15063, 24808, 16186, 11302, 15506, 15951, 22541, 21368, 13731, 9125, 12015, 7959, 14331, 17177, 13947, 16868, and 16531.

In one embodiment, the determined lengths are formed into a fixed-dimension vector, such as for example a 16-dimensional vector. Thus, if the disc has more than 16 tracks, any extra track lengths are discarded; if the disc has fewer than 16 tracks, the track lengths are repeated starting at the first length to fill the remaining positions in the vector. The vector for the above query would thus be: [24896 15914 14622 19370 15063 24808 16186 11302 15506 15951 22541 21368 13731 9125 12015 7959]

Had the disc only 10 tracks, the $1^{st}$ through $6^{th}$ lengths would be repeated in positions 11-16: [24896 15914 14622 19370 15063 24808 16186 11302 15506 15951 24896 15914 14622 19370 15063 24808]

One skilled in the art will recognize that variable-dimension vectors could also be used.

Once the system has created 602 a vector, it determines 603 whether any records in database 106 are associated with Disc IDs that exactly match the determined vector. In one embodiment, the system makes determination 603 using a hash table that maps the TOC vector to the database records, according to hash table techniques that are well known in the art. In one embodiment, if any matches are found, the system returns 604 the matching Disc IDs. For example, server 105 may transmit the matching Disc IDs to client module 104. In another embodiment, server 105 retrieves metadata associated with the matching Disc IDs, and returns the metadata itself to client module 104.

If, in 603, no exact match is found, the system looks for approximate matches. In one embodiment, the system performs 606 dot product operations (or some other technique of approximate matching) on the determined vector, comparing it with vectors for Disc IDs in database 106. If the results of any dot product operations exceed a predetermined threshold 607, the system returns 608 the matching Disc IDs. For example, server 105 may transmit the matching Disc IDs to client module 104. In another embodiment, if the results of any dot product operations exceed the threshold 607, server 105 retrieves metadata associated with the matching Disc IDs, and returns the metadata itself to client module 104.

If no dot product results exceed the threshold, the system returns 610 a "not found" message. In one embodiment, in such an event, client module 104 requests the metadata from another source, and/or prompts the user to enter the metadata manually.

In one embodiment, once the method of FIG. 6 returns one or more Disc IDs in step 604 or 608, the Disc IDs are transmitted to client module 104. Client module 104 then issues one or more "Read" requests to obtain the metadata for the Disc ID(s) it received. The requests may be transmitted to the same metadata server 105 or to some other server (not shown). Accordingly, in one embodiment, server 105 looks up Disc IDs but does not serve metadata itself; that task is left to other servers. In an alternative embodiment, server 105 looks up Disc IDs and also serves metadata to client modules 104. In yet another embodiment, server 105 serves metadata in response to the metadata request 601, without performing the intermediary step of returning Disc IDs.

The following are examples of some techniques of approximate matching that can be used in connection with the present invention, for example in step 606 of FIG. 6.

Cosine Match

A cosine or dot-product match is used to find vectors that are similar but not identical.

Given vectors A and B $$A \cdot B = |A||B| \cos \theta$$

Where θ is the angle between A and B. When A and B are normalized to unit vectors, the dot product produces the cosine of the angle between them, which is 1.0 for identical vectors, near 1.0 for similar vectors, and near 0.0 for vectors which are not similar.

A cosine match is implemented by forming the vector for the TOC data in a query, normalizing it to unit length, and performing pairwise dot products with all normalized TOC vectors in the database. The maximum dot product indicates the greatest degree of similarity.

Difference Match

A difference match is typically computed on un-normalized vectors. The difference match is computed as:

$$\Sigma(A_i-B_i)^2$$

or $$\Sigma|A_i-B_i|$$

Where Ai represents the ith element of vector A, and Bi represents the ith component of vector B and the summation occurs over all dimensions of the vector (i=0 to n-1) for n-dimensional vectors.

Popularity Match Optimization

An optimization to vector matching is to perform approximate matching on only the most popular CDs first. If a cosine score above a predetermined threshold is obtained, a match is likely and the results can be returned. Otherwise, vector comparisons are performed against the balance of the database.

Total Disc Length Match Optimization

Another optimization to vector matching is to retrieve the TOC vectors for all discs that have similar total lengths. This constrains the number of vector comparisons that must be performed to produce a match.

Multiple Metadata Sources

In one embodiment, the present invention provides mechanisms for accessing, integrating, and resolving metadata from two or more sources. For example, metadata may be available from a commercial source, such as for example All Media Guide (AMG) of Ann Arbor, Mich., as well as from a database containing user-entered information. The commercial source may be deemed more reliable than the user-entered database. Thus, in one embodiment, the system retrieves metadata from the commercial source when available, but falls back on the user-entered database when the commercial source is not able to provide the requested metadata.

Any number of data sources may be integrated in this manner. Tiers of relative credibility can be established, so that the system favors those sources that have higher credibility, and only uses lower-credibility sources when the metadata is not available elsewhere. For example, some metadata databases include metadata that has been translated from one language to another. In general, translated metadata is deemed less credible than metadata that is in its original language. Thus, the system of the present invention can be configured to favor non-translated metadata over translated metadata.

As another example, when user-entered metadata has been corroborated by two or more independent sources (for example, if two or more users have entered matching metadata), it is deemed more credible than user-entered metadata that has not been corroborated.

Figure 10:
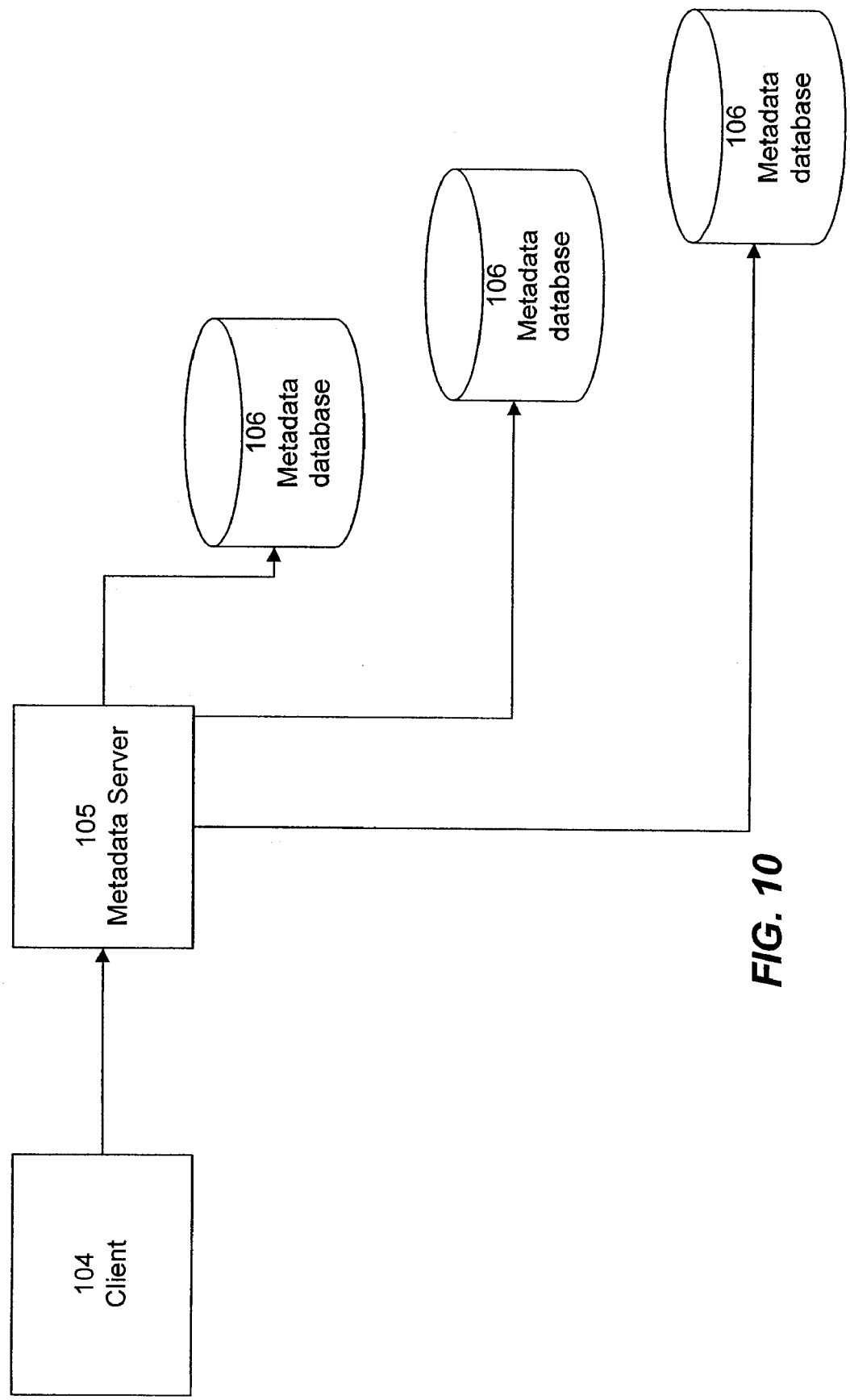
FIG. 10 is a block diagram depicting an implementation of the present invention in which several separate metadata databases are provided.

Referring now to FIG. 10, there is shown an example of an implementation of the present invention in which several separate metadata databases 106 are provided. Each database 106 is associated with a tier designation that denotes the relative credibility of the metadata therein. When client 104 requests metadata, server 105 accesses databases 106 in a tiered manner according to the techniques set forth below. For example, metadata databases 106 may include a commercial metadata database, corroborated metadata database, and uncorroborated metadata database.

Figure 11:
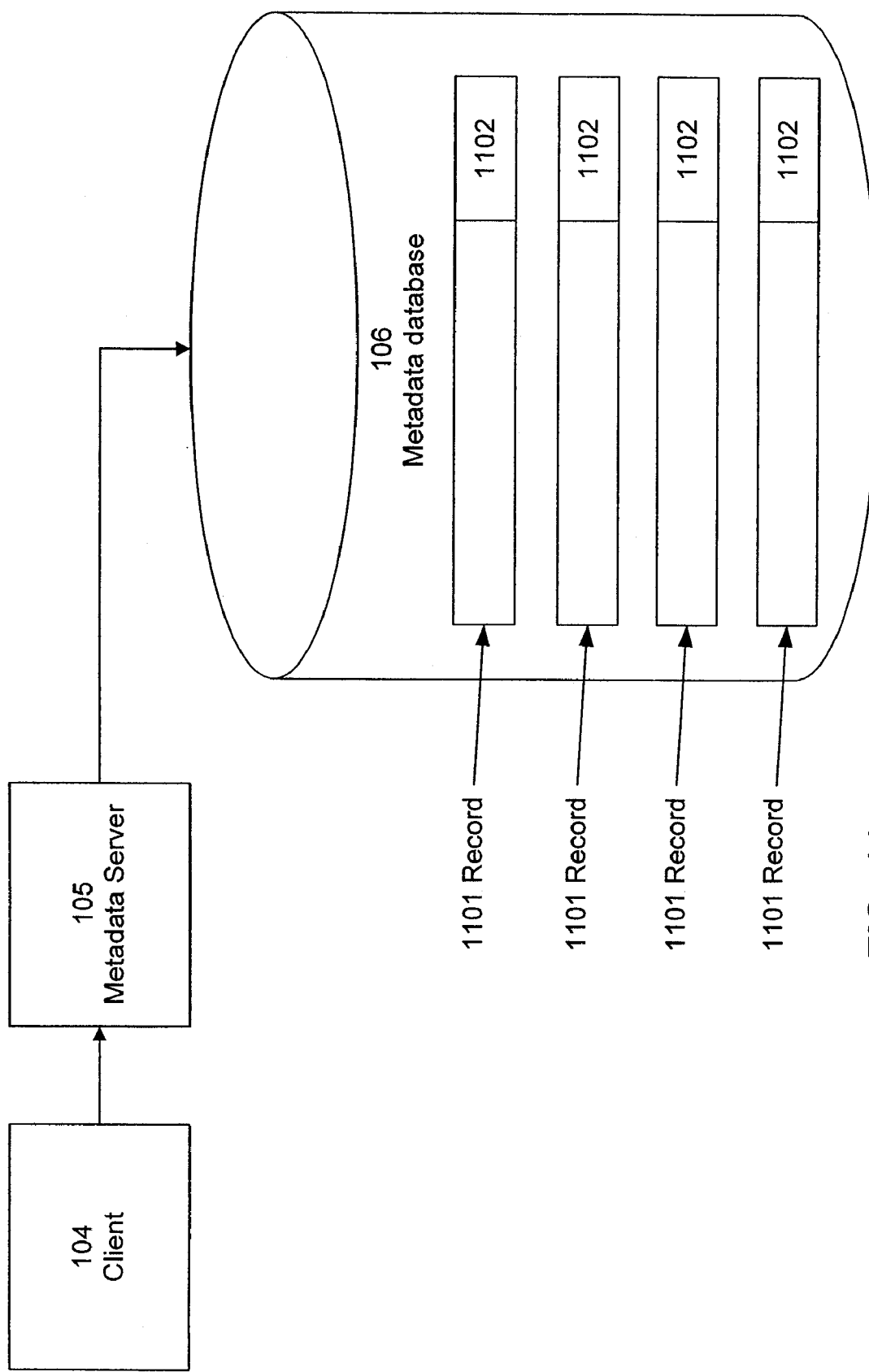
FIG. 11 is a block diagram depicting an implementation of the present invention in which a single database contains metadata records having different levels of credibility.

Referring now to FIG. 11, there is shown another embodiment, wherein a single database 106 contains metadata records 1101 having different levels of credibility. Database 106 may include metadata records from various sources that have been merged, such as commercial metadata, corroborated user-entered metadata, non-corroborated metadata, and the like. Each record 1101 includes a tier designation 1102 indicating its credibility level. Tier designation 1102 can take any form, such as for example a numeric indicator of credibility level. Metadata credibility is thus tracked on a record-by-record basis. When client 104 requests metadata, server 105 tries to obtain the metadata using higher-tiered records before resorting to lower-tiered records.

One skilled in the art will recognize that the invention can be practiced using any of a number of different types of physical and logical database configurations and architectures, and that the depictions of FIGS. 10 and 11 are merely exemplary.

Associating and Linking

In some situations, one or more metadata databases 106 may be missing useful pieces of information. For example, referring now to FIG. 12, there is shown an example wherein commercial database 106B contains album titles 1202, artist information 1203, and song titles 1204, but is missing TOC-based Disc IDs 1201 for at least some CDs. Such omissions may occur, for example, if TOC data was not available for some CDs when commercial database 106B was first created. Thus, when a user inserts CD 101, server 105 is not able to locate a matching record in commercial database 106B using information derived from the TOC of CD 101.

Figure 12:
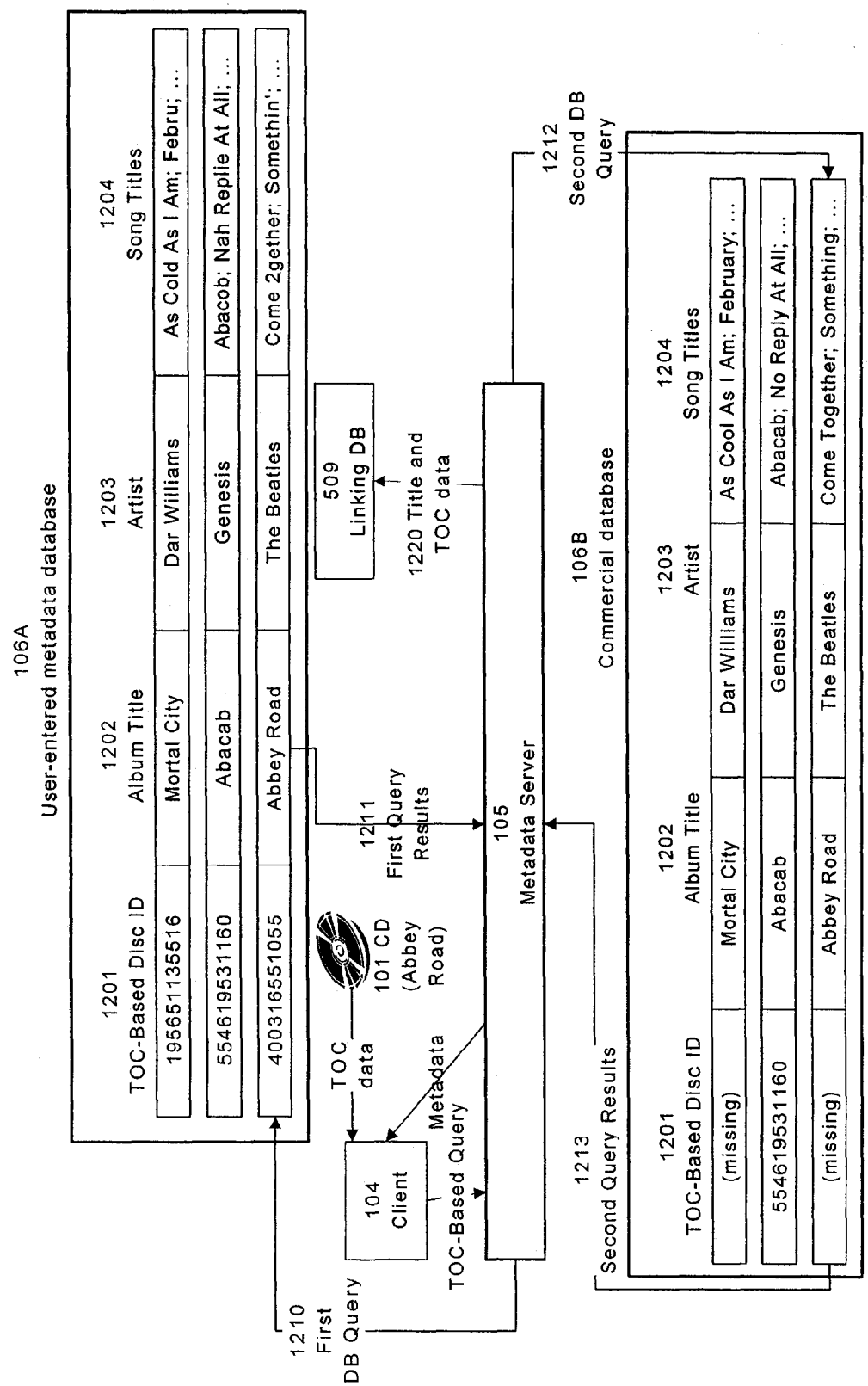
FIG. 12 is a block diagram depicting an example of a database lookup technique of the present invention, wherein at least one database is missing some information.

The present invention provides several techniques for addressing this problem. One technique is to look for the desired metadata and TOC-based Disc ID another database, such as a user-entered database 106A. Often, however, commercial database 106B contains higher-quality metadata than does user-entered database 106A (as shown in FIG. 12, where database 106A contains several typographical errors and misspellings). Thus, using database 106A entails a sacrifice in quality.

In one embodiment, therefore, the invention employs the technique illustrated by the example of FIG. 12. Upon receiving a TOC-based query from client 104, if commercial database 106B yields no results, server 105 issues a first database query 1210 to user-entered database 106A using the TOC-based Disc ID received from client 104. Once the first query results 1211 are received, data from those results 1211 such as album title and/or other unique data) are used to generate a second database query 1212. Second database query 1212 may be based, for example, on album title and artist. Second database query 1212 is used to look up the higher-quality record in commercial database 106B. Results 1213 are returned to server 105, which can then provide the results to client 104. In a variation on this embodiment, the entire metadata record or significant portions thereof can be used as the second database query. For example, the album title, artist, and the track list is used as query 1212. Approximate string matching techniques are used in this query to ensure that each track in matching records matches at least approximately. Thus, for example, the track lists for the album titled Abacab in database 106A and 106B would match.

In one embodiment, linking database 509 is also provided. Linking database 509 includes records that link items of information from different databases 106. For example, once second query results 1213 are received by server 105, server 105 creates a new record in database 509 including title and TOC data 1220. Thus, in the future, server 105 can consult linking database 509 to more efficiently find missing pieces of information such as TOC data, without having to perform queries on multiple databases 106A, 106B, etc.

Figure 13:
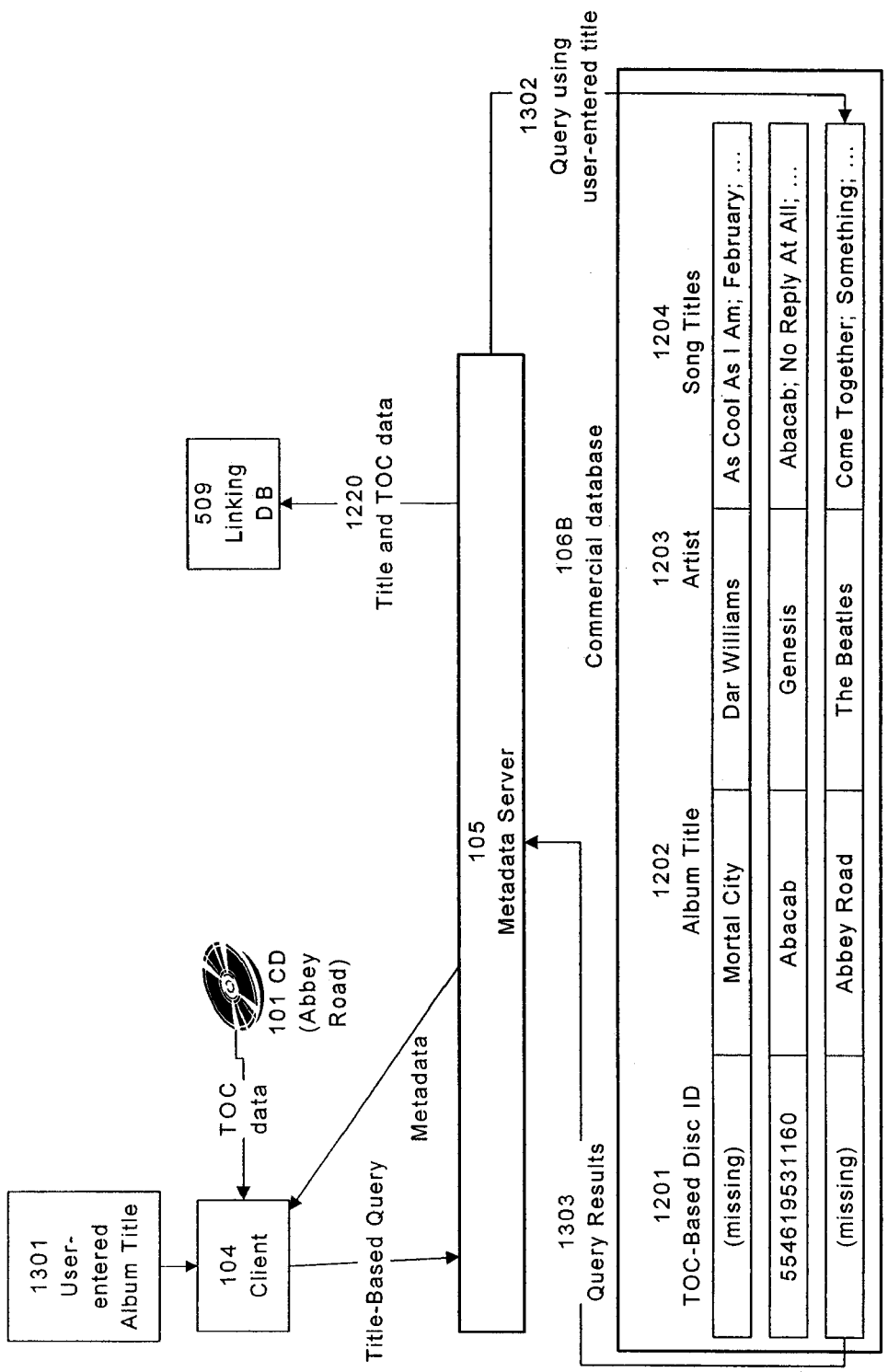
FIG. 13 is a block diagram depicting a second example of a database lookup technique of the present invention, wherein at least one database is missing some information.

Referring now to FIG. 13, there is shown an example wherein commercial database 106B is missing TOC-based Disc IDs 1201, and wherein a user-entered album title 1301 is used to locate the desired record. In this example, when the TOC-based query yields no results, client 104 prompts the user to enter album title information. Alternatively, the user could be asked to provide artist information, or to scan or type in the UPC from the album cover. Based on the user-entered information, server 105 constructs query 1302. Running query 1302 on database 106B yields query results 1303 that include metadata from the desired record. The metadata is then transmitted to client 104.

In one embodiment, server 105 creates a record in linking database 509, containing the title, or some other unique identifier of the record in database 106B, and TOC data 1220. Thus, in the future, if the same CD 101 is inserted, server 105 can query linking database 509 with the TOC of CD 101 to look up the title of the album or other identifier, and then use the album title or identifier to find the desired record in database 106B. This obviates the need for additional user input.

In an alternative embodiment, wherein server 105 has write privileges for database 106B, once query results 1303 are retrieved, server 105 writes the missing information (such as the TOC-based Disc ID) in the appropriate record of database 106B.

Figure 14:
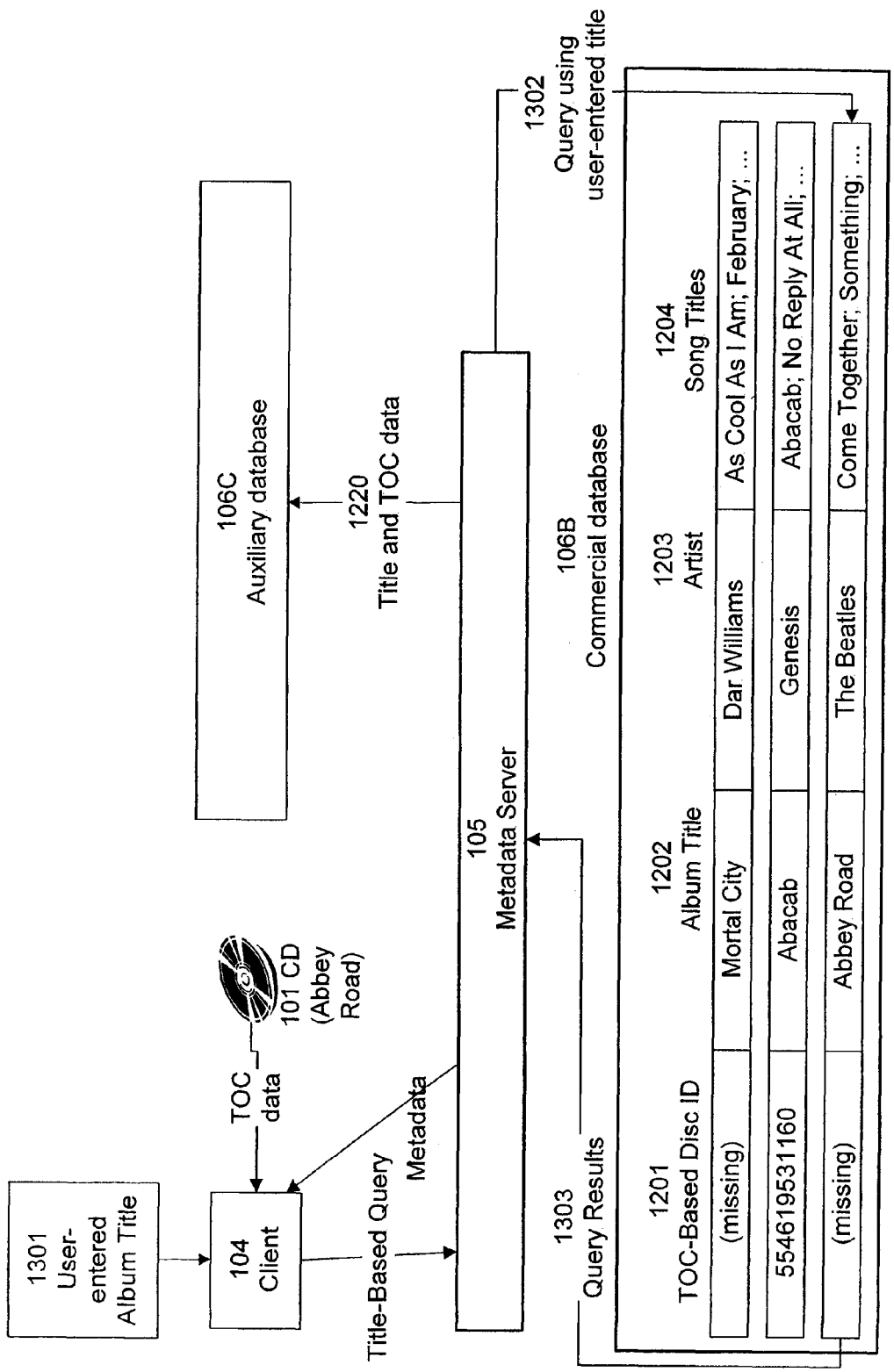
FIG. 14 is a block diagram depicting a third example of a database lookup technique of the present invention, wherein at least one database is missing some information.

In yet another embodiment, depicted in FIG. 14, once query results 1303 are retrieved, server 105 creates a new record in an auxiliary database 106C, copying the record from database 106B and also adding missing information such as TOC-based Disc ID. Thus, future lookups for the CD can be performed on auxiliary database 106C instead of on commercial database 106B.

Figure 15:
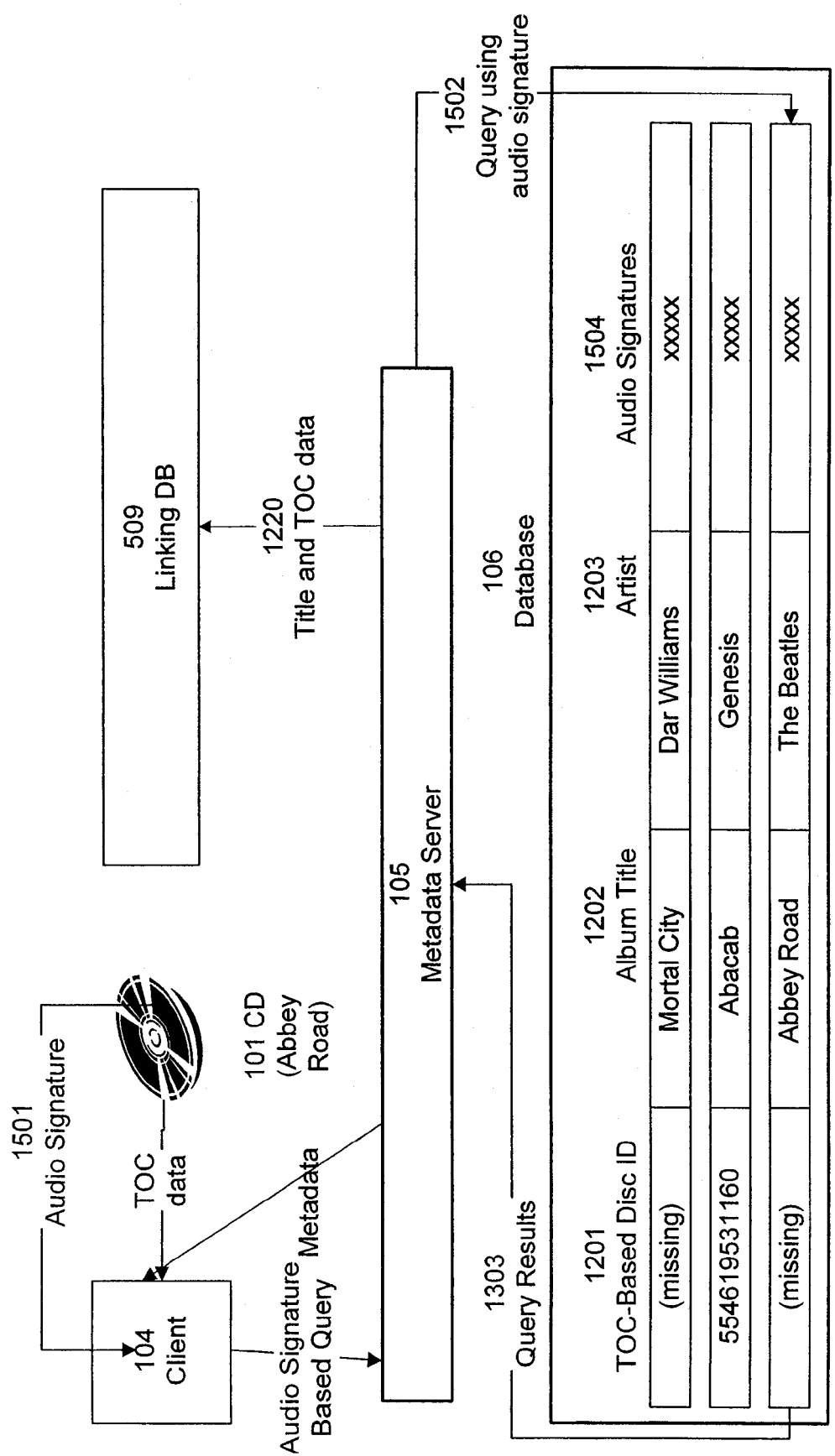
FIG. 15 is a block diagram depicting a fourth example of a database lookup technique of the present invention, wherein at least one database is missing some information, and wherein an audio signature is used to formulate a query.

Referring now to FIG. 15, there is shown an example wherein database 106 (which can be commercial database 106B or some other database) stores album titles 1202, artists 1203, and audio signatures 1504. An audio signature 1504 is an identifier that can be derived from audio data such as a music file on a CD 101. In one embodiment, audio signatures 1504 for use by the present invention are derived from audio information using the music information retrieval techniques described in related U.S. patent application Ser. No. 10/167,807 for "Music Information Retrieval," filed Jun. 11, 2002, the disclosure of which is incorporated herein by reference. In another embodiment, audio signatures are derived from music files using any known technique of feature extraction or algorithmic processing on the digital files. One such technique, developed by Fraunhofer Institute IIS, Ilmenau, Germany, takes an average spectrum over some period of time and then derives spectral flatness measures in each of several bands. These spectral flatness measures are then quantized using a probabilistic quantizer into an 8-bit quantity. The result is a highly compressed representation of the original signal that has the property that alternative versions of the same signal will have similar signatures. Another audio signature technique is available in a product called TRM, available from Relatable, LLC of Alexandria, Va.

In the example of FIG. 15, database 106 is missing TOC-based Disc IDs 1201 for some records. One or more audio signature extracted from CD 101 is used to locate the desired record. In this example, when the TOC-based query yields no results, client 104 automatically extracts an audio signature from CD 101. Based on the audio signature(s), server 105 constructs query 1502. Running query 1502 on database 106 yields query results 1303 that include metadata from the desired record. The metadata is then transmitted to client 104.

In one embodiment, server 105 creates a record in linking database 509, containing the audio signature(s), TOC data 1220, and album title or other unique identifier. Thus, in the future, if the same CD 101 is inserted, server 105 can query linking database 509 with the TOC of CD 101 to look up the title of the album or other identifier, and then use the album title or other identifier to find the desired record in database 106B. This obviates the need for additional audio signature generation or lookup.

In one embodiment, server 105 creates a record in linking database 509, even when a TOC-based Disc ID is present in database 106B. Thus, database 509 contains a robust set of associations between audio signatures and TOC-based Disc IDs. Such association can be useful for future queries, or for increasing the level of confidence when there is some doubt as to the accuracy of a TOC-based Disc ID. In some cases, an audio signature can map to more than one TOC-based Disc ID; for example, if an audio signature is associated with a song that appears on more than one CD (for example, on a studio release and then on a compilation album), records in linking database 509 may link the audio signature for the song with TOC-based Disc IDs for each of the CDs on which the song appears. Such additional links may be useful, for example to provide a user with a list of CDs that contain a particular song of interest.

One skilled in the art will recognize that the above described techniques, and the block diagrams of FIGS. 12-15, depict the operation of the invention in terms of an example, and that such examples are not intended to limit the scope of the claims herein. In particular, although the above examples depict commercial database 106B as missing TOC-based Disc IDs, the present invention can be applied to situations where other pieces of information are missing and/or incorrect. In addition, when TOC data is missing, other techniques for obtaining additional information may be used. For example, a scanner may read the UPC or other bar code from the CD packaging, or the user may provide some other piece of identifying information. In addition, when results of a query are ambiguous or uncertain, the user can be prompted to indicate which of several results is the desired result or to confirm a correct result. The creation of an entry in the linking database may be dependent on the confirmation by one or more users that the association is correct. One skilled in the art will recognize that additional variations are possible, without departing from the essential characteristics of the invention.

User-entered information and/or audio signatures can also be used to resolve any ambiguity resulting from variations in TOC data. It is known that TOC data can vary from one copy to another of a particular disc; these variations can result from slight differences among pressings of the disc, or from differences in CD drives reading the discs. In many cases, the above-described vector matching techniques are able to detect approximate matches and thereby select those metadata records that are most likely to be pertinent to the inserted CD. Once those close matches have been identified, it is useful to confirm that one (or more) of the close matches is in fact the appropriate record. In one embodiment, therefore, once a set of close matches in database 106 have been found, client module 104 presents the closely matching metadata record(s) to the user and prompts the user to confirm which (if any) of the records is a correct match. Server 105 then creates a record in linking database 509, to associate the TOC data of the inserted CD with the confirmed record(s) in database 106. The TOC data derived from the inserted CD is referred to as a "TOC variant," since it does not exactly match the TOC data originally associated with the metadata record. Subsequently, if the user (or another user) inserts a CD having the TOC variant, server 105 can determine, from linking database 509, which record(s) in database 106 is pertinent, and retrieve the record(s) without having to confirm with the user. In one embodiment, database 106 includes an indicator of a credibility level with respect to a metadata record; if more than one user corroborates the association of the TOC variant with the same metadata, the credibility level of the metadata record increases.

In an alternative embodiment, rather than prompting the user for confirmation, server 105 compares metadata from the closely-matching records with user-entered CD information. If the user-entered CD information matches the metadata in a record, that record is considered to be confirmed. Server 105 then creates a record in linking database 509, to associate the TOC data of the inserted CD with the confirmed record(s) in database 106. Again, the TOC of the inserted CD is considered a TOC variant, and subsequently inserted CDs having the TOC variant can be recognized without additional confirmation.

In yet another embodiment, server 105 compares audio signatures from the closely-matching records with an audio signature obtained from the inserted CD. If the audio signature obtained from the inserted CD matches the audio signatures from a closely-matching record, that record is considered to be confirmed. Server 105 then creates a record in linking database 509, to associate the TOC data of the inserted CD with the confirmed record(s) in database 106. Again, the TOC of the inserted CD is considered a TOC variant, and subsequently inserted CDs having the TOC variant can be recognized without additional confirmation.

In any of the above-described embodiments, instead of creating a record in linking database 509, if server 105 has write privileges for database 106, it can create one or more new records in database 106 to associate the TOC variant with the metadata from the matching metadata record(s). Alternatively, server 105 can create one or more such records in an auxiliary database 106C to associate the TOC variant with the metadata from the matching metadata record(s). Alternatively, if server 105 has write privileges for database 106, it can add the TOC variant to existing metadata record(s) in database 106, so that server 105 can recognize the TOC variant without reference to any other databases.

Figure 5:
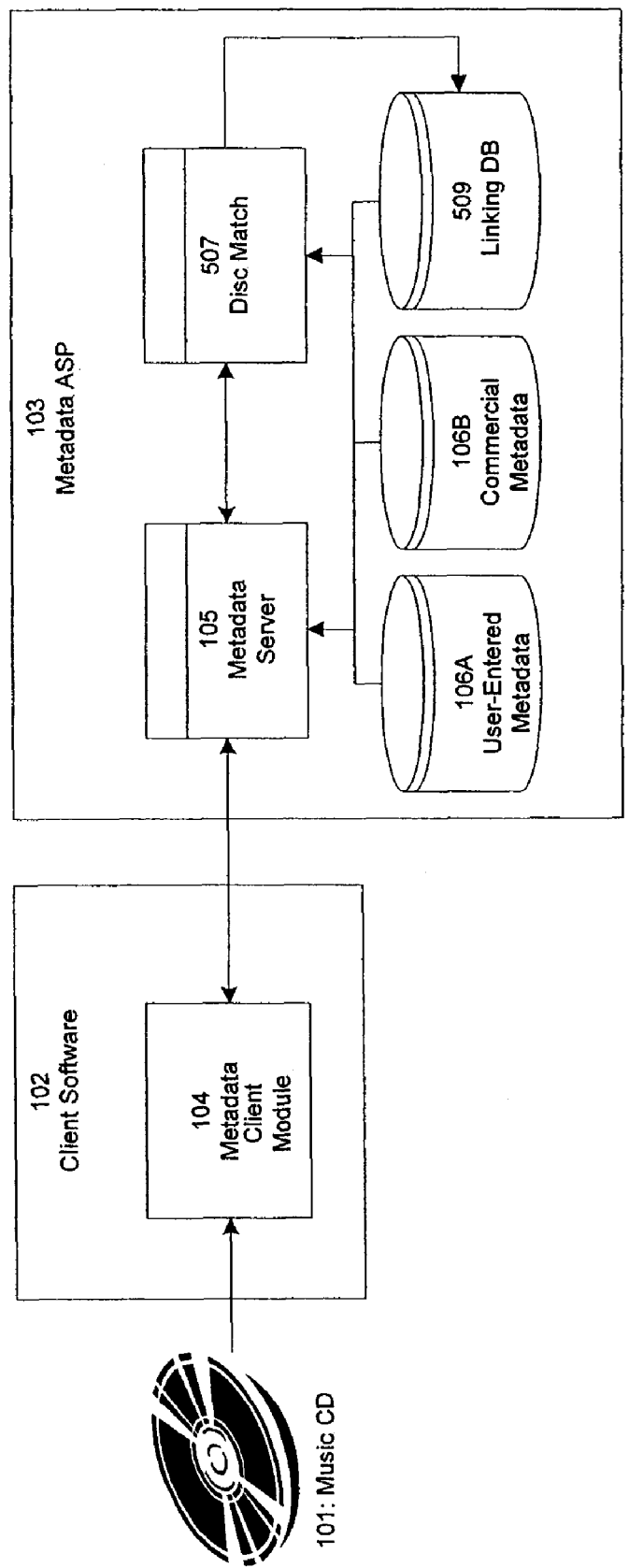
FIG. 5 is a block diagram depicting an improved system for linking and associating metadata from two or more sources, according to one embodiment of the present invention.

Referring now to FIG. 5, there is shown a system for implementing the above-described techniques of linking and associating metadata from two or more sources, according to one embodiment of the present invention. In the exemplary system shown in FIG. 5, the invention uses linking database 509 to link user-entered metadata stored in database 106A with commercial metadata stored in database 106B. Commercial metadata database 106B contains, for example, content that has been purchased or licensed from a source of music information, such as for example All Media Guide (AMG) of Ann Arbor, Mich. One skilled in the art will recognize that the techniques of the present invention can be applied to metadata derived from any source.

In one embodiment, the present invention is implemented using three major system components: client software 102 (including metadata client module 104); metadata server 105; and disc match module 507. In the following description, metadata server 105 handles incoming metadata submissions, such as user-entered metadata; however, in an alternative embodiment, a separate module (not shown) handles such submissions.

Linking database 509 contains mappings from TOC based Disc IDs that are used in database 106A to record identifiers in the database 106B. Server 105 uses database 509 us to find data in the database 106B, given a Disc ID for database 106A The following is an example of a data format used to store the database in a file. In this example, records are separated by lines consisting of a single period (.). A TOC Identifier is found on lines beginning with "#0+" and a "DISCID=<some number>" denotes the record identifiers in database 106B or 106A (the leading digit of the identifier indicates which database to use.)

0+6+183+49120+78783+102020+167320+200438+
227175+3029 DISCID=4050f0ea
0+10+182+17072+36722+51550+70497+87785+
113515+138755+175835+198332+22
DISCID=00036b66

Disc Match module 507 initially populates linking database 509. It matches user-entered metadata with the metadata in commercial database 106B to establish the mappings. Techniques for determining these matches are described in more detail below in connection with FIG. 8.

In one embodiment, client module 104 and server 105 provide additional functionality to minimize the amount of data a user might need to enter for an unrecognized disc, as will be described in more detail below. For example, when the server 105 indicates to the client 104 that the disc is unrecognized, the client module 104 prompts the user to enter the artist name and/or title of the disc. This information is sent back to server 105, which uses it in a query against linking database 509. The results of this query are returned to client 104, which displays them for the user. Should the user accept the results of the query, the disc TOC and the Disc ID are sent from client module 104 to server 105. Disc Match module 507 creates a new association between the TOC and the Disc ID in linking database 509.

Databases 106A and 106B may be local or remote with respect to metadata application service provider (ASP) 103.
Improved Metadata Client Module 104

In one embodiment, the present invention is backward compatible with existing populations of client software 102. Furthermore, in one embodiment, the improved client module 104 of the present invention is backward compatible with existing metadata servers 105 that do not include the improved functionality set forth herein. In one embodiment, the dialog boxes described below are presented as part of a user interface of client module 104.

Figure 20A:
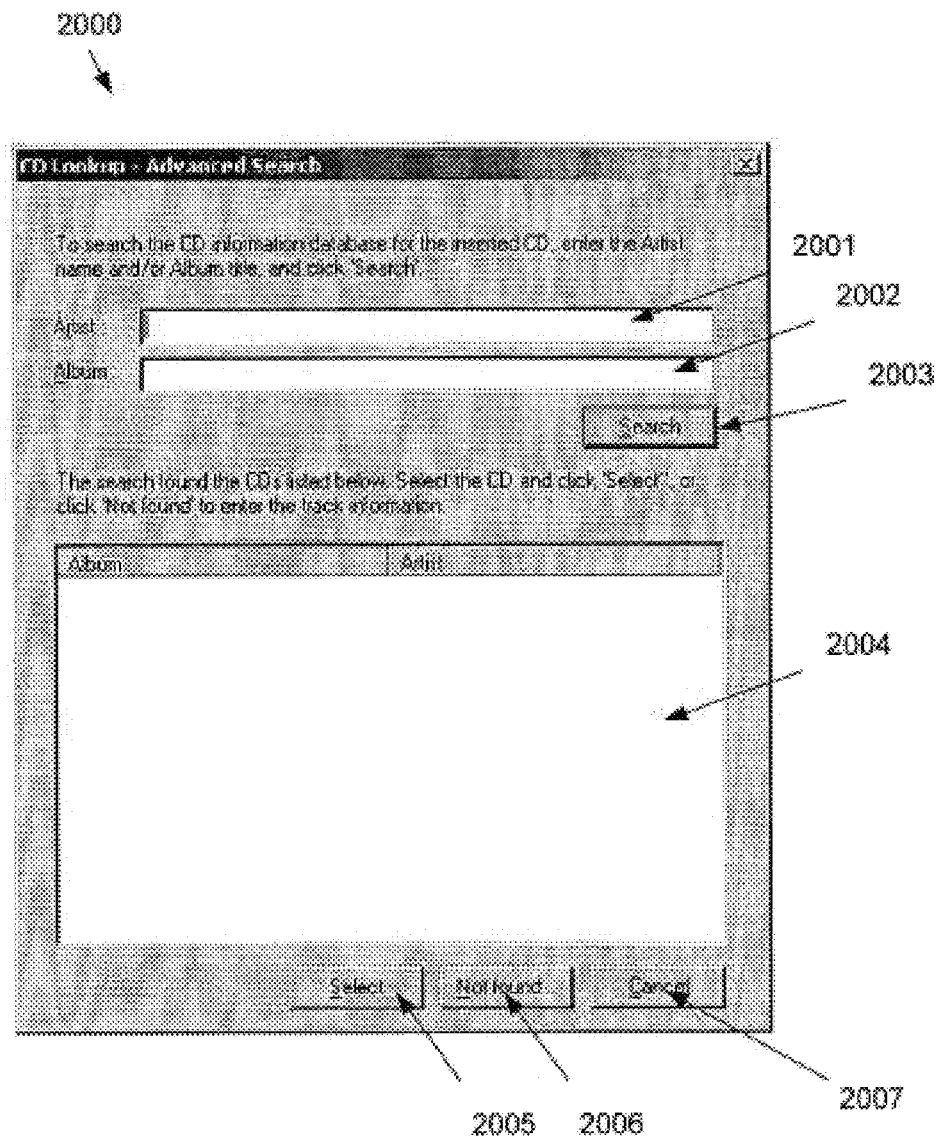
FIGS. 20A and 20B are screen shots showing examples of dialog boxes for an advanced search function according to one embodiment of the present invention.
Figure 20B:
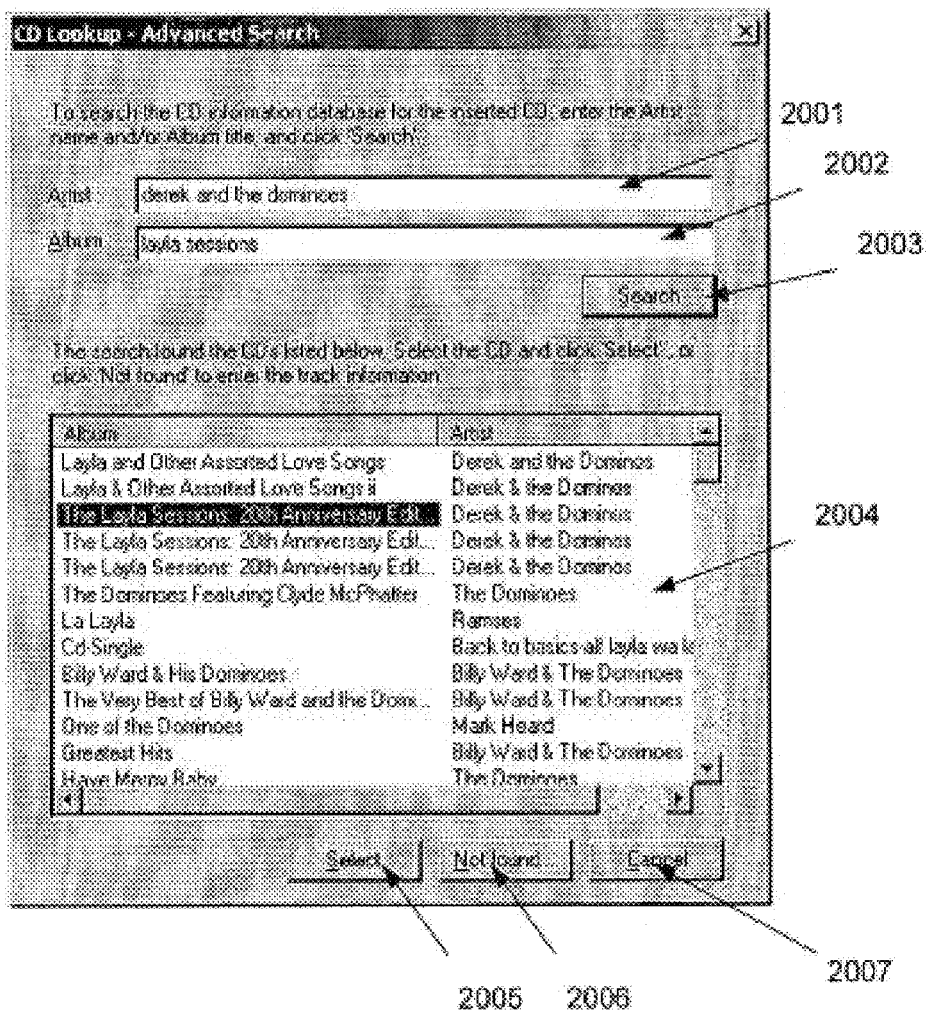
Figure 20C:
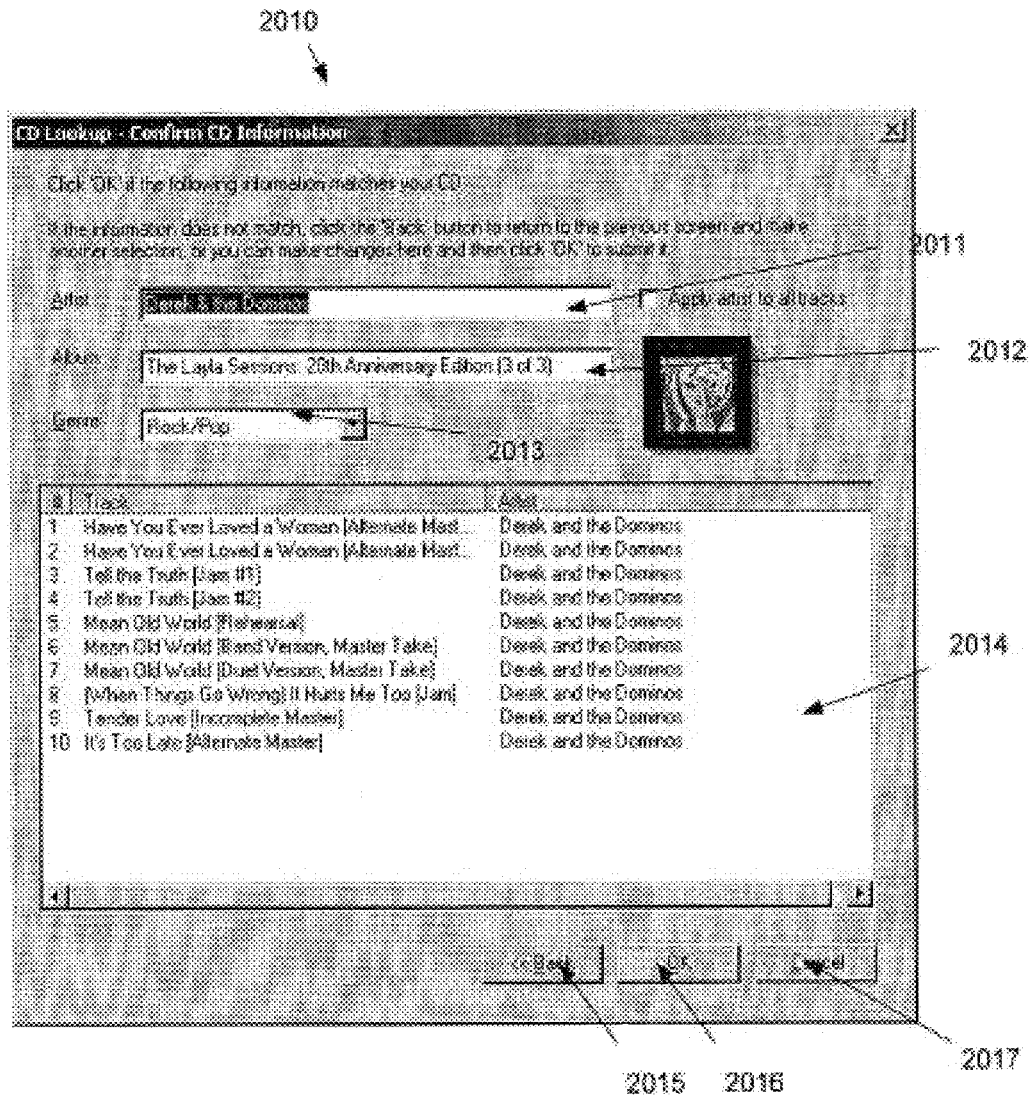
FIG. 20C is a screen shot showing an example of a dialog box for confirming CD information according to one embodiment of the present invention.
Figure 20D:
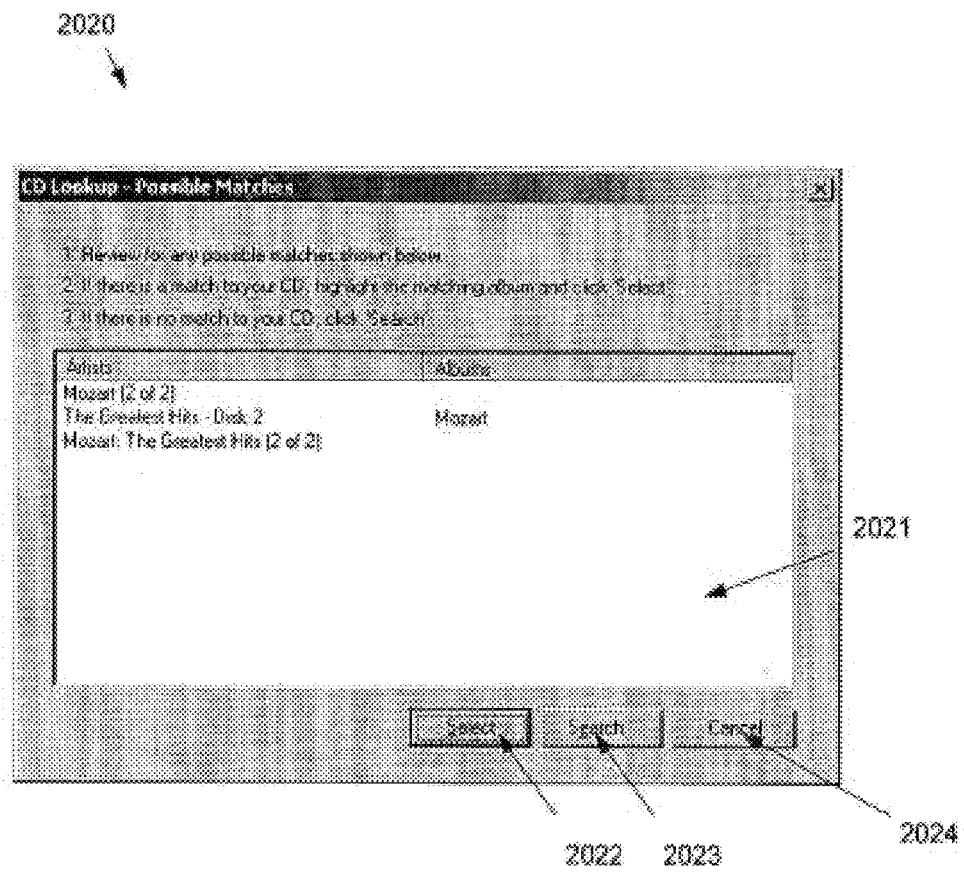
FIG. 20D is a screen shot showing an example of a dialog box for presenting possible matches according to one embodiment of the present invention.
Figure 21:
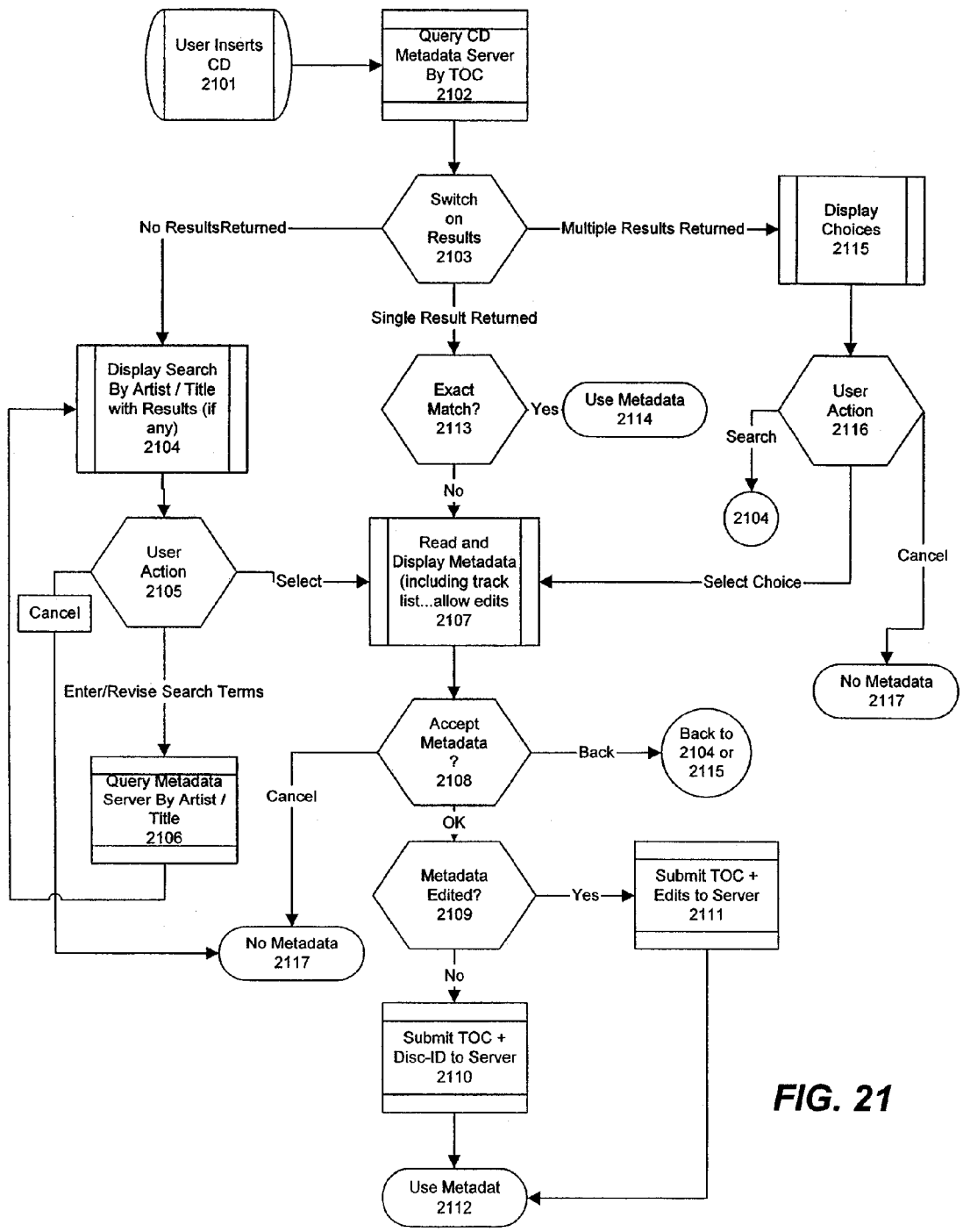
FIG. 21 is a flowchart depicting details of a method of handling metadata submission according to one embodiment of the present invention.

Referring now to FIG. 21, there is shown a flowchart depicting details of a method of handling metadata submission according to one embodiment of the present invention. Referring also to FIGS. 20A through 20D, there are shown screen shots of dialog boxes presented by the user interface of client module 104 in connection with the method of FIG. 21, according to one embodiment.

A user inserts a CD 2101. Client module 104 queries 2202 metadata server 105 to initiate a TOC-based search. Step 2103 determines whether multiple matches, a single match, or no matches are found.

If multiple close matches or multiple exact matches are found, client module 104 displays 2115 the matches. For example, referring also to FIG. 20D, client module 104 presents dialog box 2020 to allow the user to select among the matches. Depending on the user's action 2116, client module 104 proceeds to step 2107, 2104, or 2117. The user can select a matching listing in field 2021, and click Select button 2022 to proceed to step 2107 as described below. If none of the listings match, the user can click on Search button 2023 to go to step 2104 as described below, or the user can click on Cancel button 2024 to dismiss dialog box 2020 and indicate 2117 that no metadata is to be associated with the inserted CD.

In one embodiment, if the TOC-based search yields no results, client module 104 proceeds to step 2104 to initiate an artist/title search, as described below.

In one embodiment, if the TOC-based search yields one match, client module 104 determines 2113 whether it is an exact match. If so, client module 104 assumes the match is correct, and uses 2114 the metadata from the matching record. If it is not an exact match, client module 104 proceeds to step 2107 as described below.

In step 2104, client module 104 displays a dialog box, such as dialog box 2000 shown in FIGS. 20A and 20B, depicting examples of dialog boxes 2000 for search function 2104 according to one embodiment of the present invention. Dialog box 2000 prompts the user to enter information in artist field 2001 and/or album title field 2002 as parameters for a search for matching metadata records, and shows search results (if any) in area 2004.

User action 2105 determines the next step. If the user enters artist and/or title information in fields 2001 and 2002 and clicks on search button 2003 to initiate a search, client module 104 queries 2106 server 105 by artist and/or title, and returns to step 2104 to display results.

If, once results are displayed, the user selects one or more of the displayed search results (by highlighting the result(s) and clicking on select button 2005), client module 104, proceeds to step 2107 as described below.

If the user clicks on Not found button 2006 to indicate that none of the listed results are correct, client module 104 may give the user an opportunity to manually enter track information.

The user can also click on Cancel button 2007 to dismiss dialog box 2000 and indicate 2117 that no metadata is to be associated with the inserted CD.

In step 2107, server 105 provides detailed metadata for the selected record(s) and provides the user with an opportunity to confirm the displayed metadata. Referring also to FIG. 20C, there is shown a screen shot depicting an example of a dialog box 2010 for confirming CD information according to one embodiment of the present invention. Metadata for the selected record is displayed, including artist 2011, album title 2012, genre 2013, and track listing 2014.

The user can edit 2109 the displayed metadata to correct any errors. If so, client module 104 transmits 2111 the edits, along with TOC, to server 105 for submission verification. Metadata server 105 is then able to link the TOC with the new or existing metadata record, as described in more detail below in connection with FIG. 7. Client module 104 then proceeds to use 2112 the edited metadata.

If the user clicks the OK button 2016 to confirm the displayed metadata as correct, without making edits, client module 104 posts a submission 2110, including the TOC of the inserted CD and the Disc ID, to metadata server 105. Metadata server 105 is then able to link the TOC with the new or existing metadata record, as described in more detail below in connection with FIG. 7.

Client module 104 then proceeds to use 2112 the edited metadata.

The user can click on Cancel button 2017 to dismiss dialog box 2010 and indicate 2117 that no metadata is to be associated with the inserted CD. Back button 2015 returns to previous screen 2000.

Query Format

In one embodiment, client module 104 communicates with server 105 using HTTP over the Internet. Requests for metadata are made using HTTP 'GET' requests to a uniform resource locator (URL) associated with server 105. The request includes Disc ID information, such as a listing of track lengths and other unique identifying information. Such information can be provided in any format. One skilled in the art will recognize that metadata requests can be implemented using any known techniques and formats without departing from the essential characteristics of the present invention.

Response Format
Query Responses

In one embodiment, the relevant data is returned in the body of an HTML response. The first line of the body contains a code indicating the type of return. Return codes include:
 200=exact matches
 210=inexact matches
 211=202=no match for disc The format for 200 and 210 codes (multiple matches) contains a single header line with the response code (and descriptive text that should be ignored) followed by multiple lines containing the query results. The list is terminated by a line containing a single '.'. The following is an example of a response for a single exact match:
200 Found exact matches, list follows (until terminating '.')
DINDEX0=404782b7
DTITLE0=Crash
DARTIST0=Dave Matthews Band
DGENRE0=Rock/Pop
DYEAR0=1996
DNUMBER0=1
DTOTAL0=1
DARTID0=hi.492215

The following is an example of a response where multiple items is returned:
200 Found exact matches, list follows (until terminating '.')
DINDEX0=4054819b
DTITLE0=The Eminem Show
DARTIST0=Eminem
DGENRE0=Rap/R&B
DYEAR0=2002
DTITLE1=The Eminem Show [Clean]
DARTIST1=Eminem
DGENRE1=Rap/R&B
DYEAR1=2002
DTOTAL1=1
DARTID1=hi.1347861

The response contains metadata designed to help the user choose the appropriate record when multiple items are returned. In general, the attributes returned are of the format:
 Name<index>=Value;
 where <index> is a number that binds attributes belonging to the same record together.

The following named attributes are returned:
 DINDEX—The unique metadata record identifier (Disc ID) that should be used in a "read" request to return the full set of metadata
 DARTIST—The name of the Artist
 DTITLE—The title of the Album
 DGENRE—The genre associated with the album.
 DYEAR—The year the album was first released
 DNUMBER—The disc number if this is part of a multi-disc set
 DTOTAL—The total number of discs if this is a multi-disc set.
 DARTID—An identifier that can be used to retrieve the album art image using a different request.

Read Responses

The response to a read request consists of a header line followed by Name=Value pairs (one per line) and terminated by a line consisting of a single '.' The header line consists of the code 210, followed by the category and disc-ID that were passed to the read request. The following names are returned:
 DISCID—The Id of the returned disc . . . . The same as the argument to the READ command.
 DTITLE—The title of the disc . . . Typically <ARTIST>/<ALBUM>

DARTIST—The artist associated with the disc.
DALBUM—The album name associated with the disc.
DYEAR—The year of the first release of the album.
DGENRE—The genre associated with the disc. Examples include: Avant Garde, Bluegrass, Blues, Cajun, Celtic, Children's, Classical, Comedy, Country, Easy Listening, Electronica, Environmental, Exercise, Folk, Gay, Gospel, Holiday, Jazz, Latin, Marches, Miscellaneous, New Age, Rap/R&B, Reggae, Rock/Pop, Sound Effects, Soundtrack, Spoken Word, Vocal, Women's, World TTITLE<N>—The track title for track <N> where <N> is from 0 to the number of tracks on the disc −1.

TARTIST<N> (protocol 5 only)—The artist associated with track <N> where <N> is from 0 to the number of tracks on the disc −1. Multiple artists are separated by "/".

An example of a read response is as follows:
210 category 0003851f
DTITLE=Get Rich Or Dye Tryin'
DARTIST=50 Cent
DYEAR=
DGENRE=Rap/R&B
DNUMBER=
DTOTAL=
DALBUMID=
DARTISTID=
DARTID=
TTITLE0=Intro
TARTIST0=50 Cent
TTRACKID0=
TTITLE1=What Up Gangsta?
TARTIST1=50 Cent
TTRACKID1=
TTITLE2=Patiently Waiting
TARTIST2=50 Cent ft Eminem
TTRACKID2=
TTITLE3=Many Men (Wish Death)
TARTIST3=50 Cent
TTRACKID3=
TTITLE4=In Da Club
TARTIST4=50 Cent
TTRACKID4=
TTITLE5=High All the Time
TARTIST5=50 Cent
TTRACKID5=
TTITLE6=Heat
TARTIST6=50 Cent Submission Format In one embodiment, metadata submissions are processed via an HTTP POST. The posted data is in the same format as the read response. An example of a submission post is as follows:
Proto: 5
hello:Source=MMJB+
  MMJB_KEY=&MMUID={12345678-ABCD-1234-ABCD-
  1234567890AB}&grant=1&VERSION=7.20.0169
  Gateway&OEM=Gateway&OOEM=Gateway&LANG=
  ENU
MMJB::Category: Soundtrack
MMJB::Discid: 0
Track frame offsets:
150
22790
45523
51973
68145
82055

Disc length: 1300 seconds
DISCID=0

DTITLE=8 Mile [Deluxe Edition] (2 of 2)
DGENRE=Soundtrack
DARTIST=50 Cent
TTITLE0=Rap Name
TARTIST0=Obie Trice
TTITLE1=Stimulate
TARTIST1=Eminem
TTITLE2='Til I Collapse Freestyle
TARTIST2=50 Cent
TTITLE3=Gangsta
TARTIST3=Beast, Joe
TTITLE4=The Weekend
TARTIST4=Brooklyn
TTITLE5=California
TARTIST5=Shaunta One skilled in the art will recognize that the above formats and layouts are merely examples, and that the present invention can be practiced with any other format or layout for queries, responses, and submissions.

Improved Metadata Server 105

In one embodiment, server 105 provides new services and functionality to next-generation clients while maintaining backward compatibility with existing clients. To achieve this, server 105 implements and responds to existing metadata request protocols, as well as a new protocol, described below, to support the enhanced features and metadata for next-generation clients.

Upon receiving a metadata request, server 105 attempts to use metadata from commercial database 106B when available. If database 106B does not contain the requested metadata, server 105 uses user-entered metadata database 106A as a fallback. For example, for new CDs that have not yet been entered in commercial database 106B, or for promotional discs, imports, and bootleg CDs that may never find their way into commercial database 106B, server 105 relies on user-entered database 106A.

In addition, if a user indicates that metadata from database 106B contains an error, the corrected information can be stored in database 106A. When responding to future requests, server 105 provides the corrected metadata.

In order to implement such functionality, server 105 matches metadata requests from client modules 104 with records in databases 106A and 106B, and further associates and links records in database 106A with records in database 106B. In this manner, server 105 is able to identify records in both databases that refer to the same CD. Server 105 uses information from linking database 509 to perform such associating and linking. The following are examples of methods and implementations for matching, associating, and linking metadata requests, database 106A records, and database 106B records. One skilled in the art will recognize that these techniques can be applied in any context where matching, associating, and linking of two or more database records are desired.

CD Metadata Submission Processing

Figure 7:
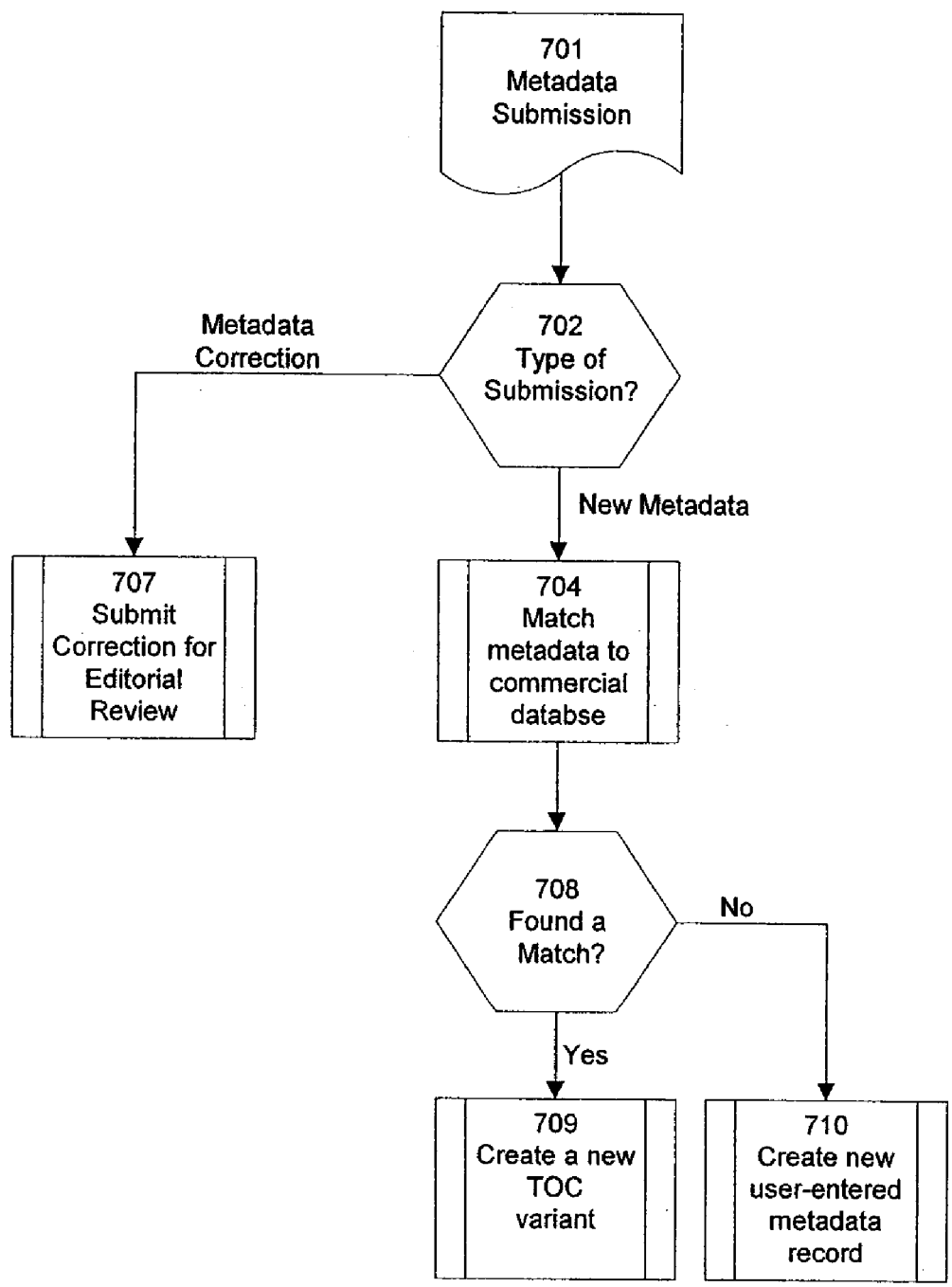
FIG. 7 is a flowchart depicting an improved server method for adding metadata information to a database, according to one embodiment of the present invention.

Referring now to FIG. 7, there is shown an improved server method for adding metadata information to a database, according to one embodiment of the present invention. The improved method of the present invention uses user submissions to create new Disc ID to Album ID mappings, so as to resolve ambiguities and to identify potential errors in the commercial metadata.

In one embodiment, server 105 performs the steps of the method of FIG. 7 when a user manually enters metadata. For example, if server 105 fails to find a matching record in database 106A or 106B in response to a metadata query, client software 102 may prompt the user to manually enter metadata. Client module 104 then transmits the metadata to server 105, which then performs the steps of FIG. 7.

Metadata server 105 receives 701 metadata, typically via HTTP over an Internet connection. Server 105 assesses the type of submission 702. If the submission represents a correction to existing metadata, in one embodiment server 105 submits 707 the corrections for editorial review (either manual, automated, or both). Based on the results of the editorial review, the correction is applied to the appropriate database 106A or 106B, or it is rejected. In one embodiment, if server 105 is not able to write to commercial database 106B, the correction may be entered in user-entered database 106A. Subsequently, whenever that metadata record is to be retrieved, the corrected metadata is retrieved from user-entered database 106A, in lieu of or in addition to the commercial metadata from database 106B.

If the received submission represents new metadata, server 105 attempts to match 704 the submitted metadata to a record in commercial database 106B. In one embodiment, the vector matching techniques described above are employed. In another embodiment, the text of the tracks is matched with candidate albums from the commercial database using an Information Retrieval index. If a match is found 708, server 105 creates 709 a new TOC variant indicating a link between the detected TOC and the Disc ID of the matching record, and stores the new TOC variant as a record in linking database 509. If no match is found, server 105 stores 710 the new metadata as a new record in user-entered database 106A.

Additional detail for an implementation of the steps of FIG. 7 according to one embodiment are provided in connection with FIG. 19, below.

Creating Linking Database 509

In one embodiment, the invention pre-populates linking database 509 so that server 105 can use commercial data where available, but fall back on user-entered data when commercial data is unavailable or inaccurate. In this manner, the invention provides more accurate information while avoiding the need to rely on users to enter a large amount of data.

In one embodiment, the invention uses TOC data from a provider of commercial metadata, such as AMG. Disc match module 507 creates a vector for the TOC data provided by AMG, maps it to the associated album ID, and stores the mapping in database 509 so that server 105 can retrieve the corresponding record from database 106B when needed.

Alternatively, the invention uses a known collection of CDs to prepopulate database 509. Disc match module 507 extracts TOC data from these CDs. If commercial database 106B includes universal product code (UPC) numbers, the CD TOC data is mapped to the commercial database using UPCs on individual disc cases. In one embodiment, a barcode reader is used to speed up the process of inputting UPC numbers.

Figure 8:
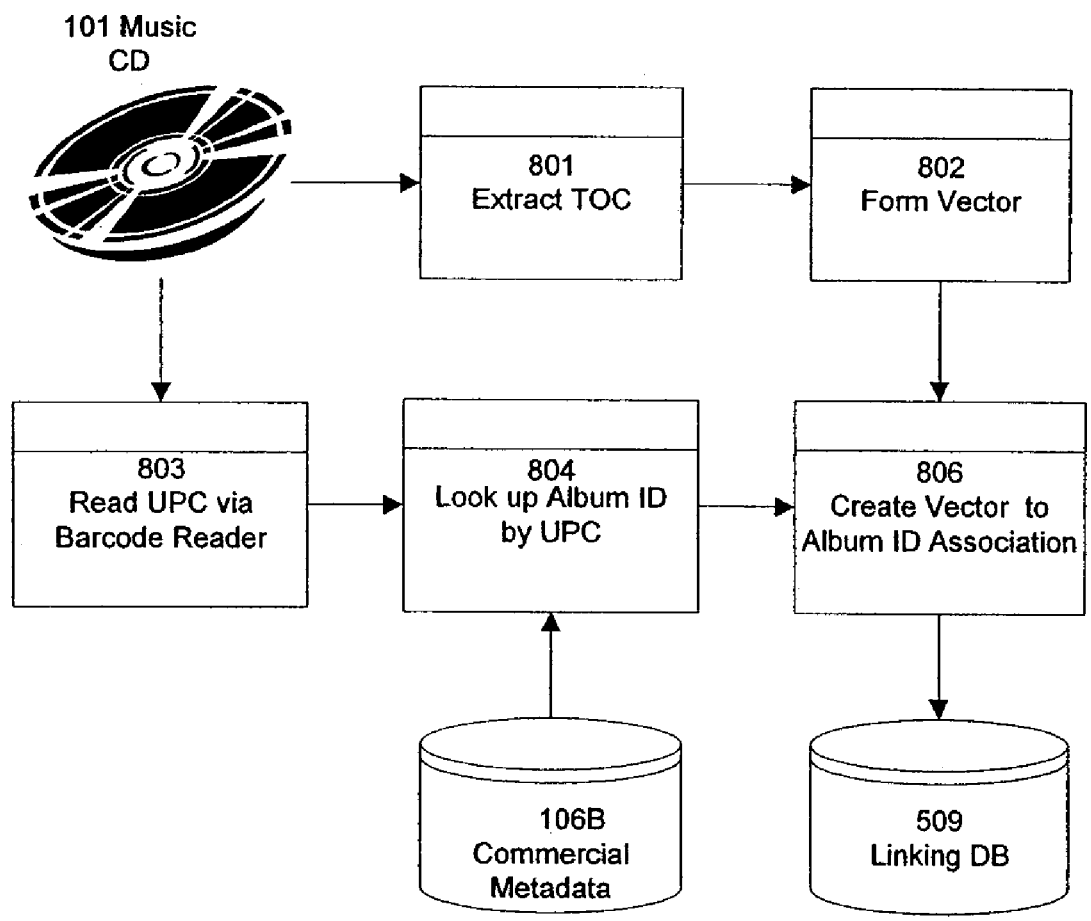
FIG. 8 is a flowchart depicting a method for creating mappings between Disc IDs and CDs, according to one embodiment of the present invention.

Referring now to FIG. 8, there is shown an example of a method for creating mappings between TOC Based Disc IDs and CDs, as performed by disc match module 507 according to one embodiment of the present invention. The method is shown in the context of populating linking database 509 using a collection of CDs. One skilled in the art will recognize, however, that the method can be adapted to populate database 509 using data from other sources.

The user inserts CD 101 into a drive. A component of client software 102 extracts 801 the TOC from the disc and forms 802 a vector as described above. A barcode reader (not shown) scans 803 the UPC barcode on the CD package. Alternatively, the user could be prompted to enter a title, code, or other information that uniquely identifies the CD. Alternatively, the system extracts audio signatures for one or more songs on the CD. Disc match module 507 uses the scanned UPC, or audio signatures, or other information, to retrieve an album ID or metadata from commercial database 106B. Module 507 then generates 806 a record associating the vector with the retrieved album ID and/or metadata. The generated record is stored in database 509.

Metadata Server 105

In one embodiment, metadata server 105 is implemented as an application server that accepts requests delivered via HTTP, performs the metadata lookups, and returns the data via an HTTP response. For example, metadata server 105 may be implemented as an instance of Tomcat, an application server available from the Apache Software Foundation of Forest Hill, Md. The Tomcat instance is extended with Java servlets to implement the functionality of the present invention.

Figure 9:
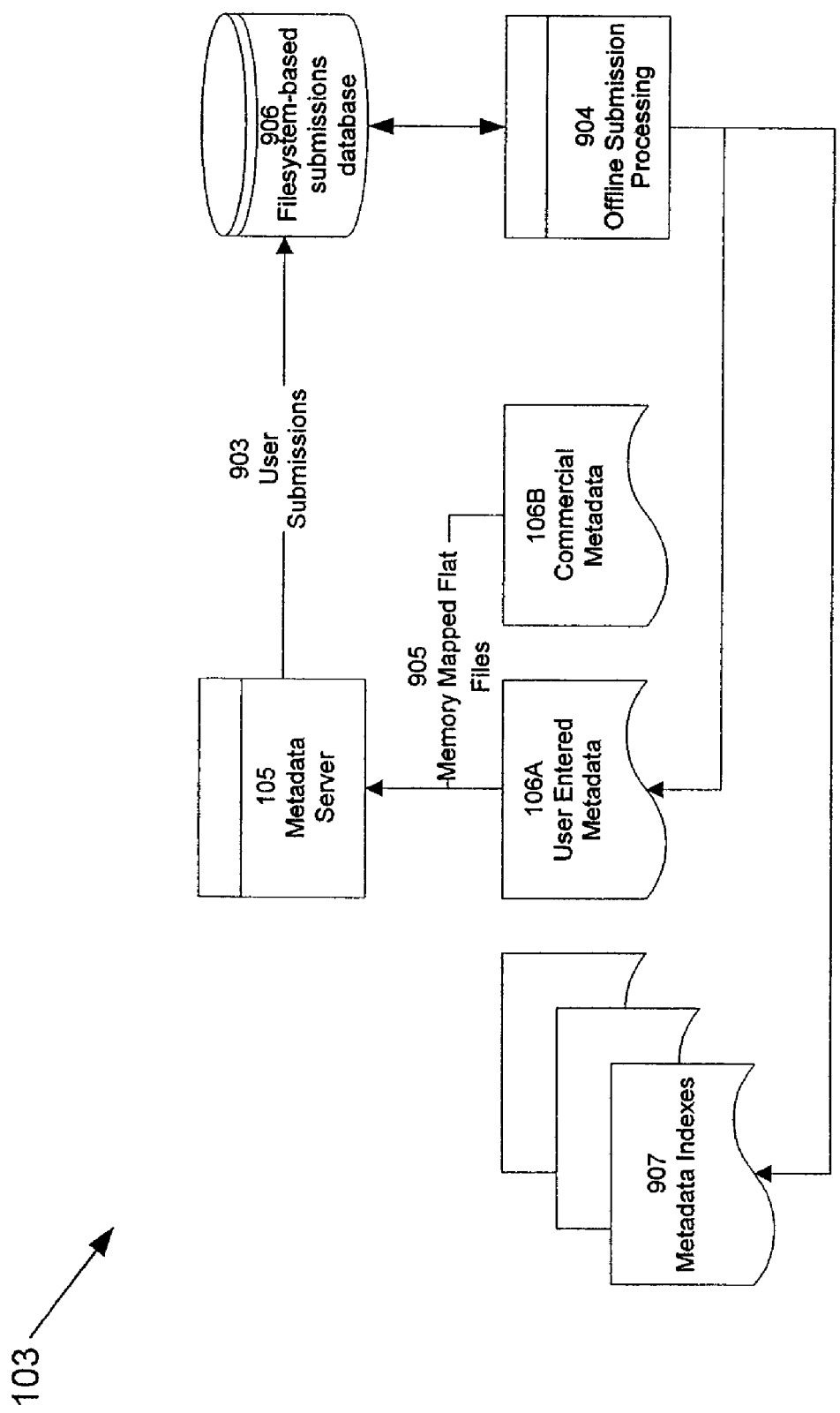
FIG. 9 is a block diagram depicting a metadata server according to one embodiment of the present invention.

Referring now to FIG. 9, there is shown an example of an implementation of metadata ASP 130 including metadata server 105 according to one embodiment of the present invention. Metadata is organized into memory-mapped files 905 and indexes 907. Each index 907 associates a vector with an offset into a memory-mapped metadata file 905. The records in metadata file 905 contain the information needed to fulfill a query request. There may be multiple metadata records associated with a single offset in the case of ambiguous results for a Disc ID.

In one embodiment, there are multiple indexes 907, such as for example:

1. Commercial TOC vectors mapping to commercial metadata;
2. User-submitted TOC vectors mapping to commercial metadata;
3. User-submitted TOC vectors mapping to user-submitted metadata;
4. Album title and artist name text mapping to commercial metadata; and
5. Album title and artist name text mapping to user-submitted metadata.

In one embodiment, when retrieving metadata according to the techniques described above in connection with FIG. 6, server 105 attempts to find exact vector matches in each index 907 in a specific order (for example, first scanning commercial TOC vectors mapping to commercial metadata, then scanning user-submitted TOC vectors mapping to commercial metadata, then scanning user-submitted TOC vectors mapping to user-submitted metadata). Server 105 returns the metadata for the first exact match found. In one embodiment, the scanning process involves calculating the vector distance between the query vector and each vector in the database. An optional performance optimization is to skip the vector difference calculation if the total disc length in seconds as reported in the TOC data does not match within a given configuration threshold. An optional performance optimization is to skip the vector difference calculation if the number of tracks reported in the TOC data does not match. An "exact" match is a match for which the vector difference is smaller than a predetermined threshold.

Figure 19:
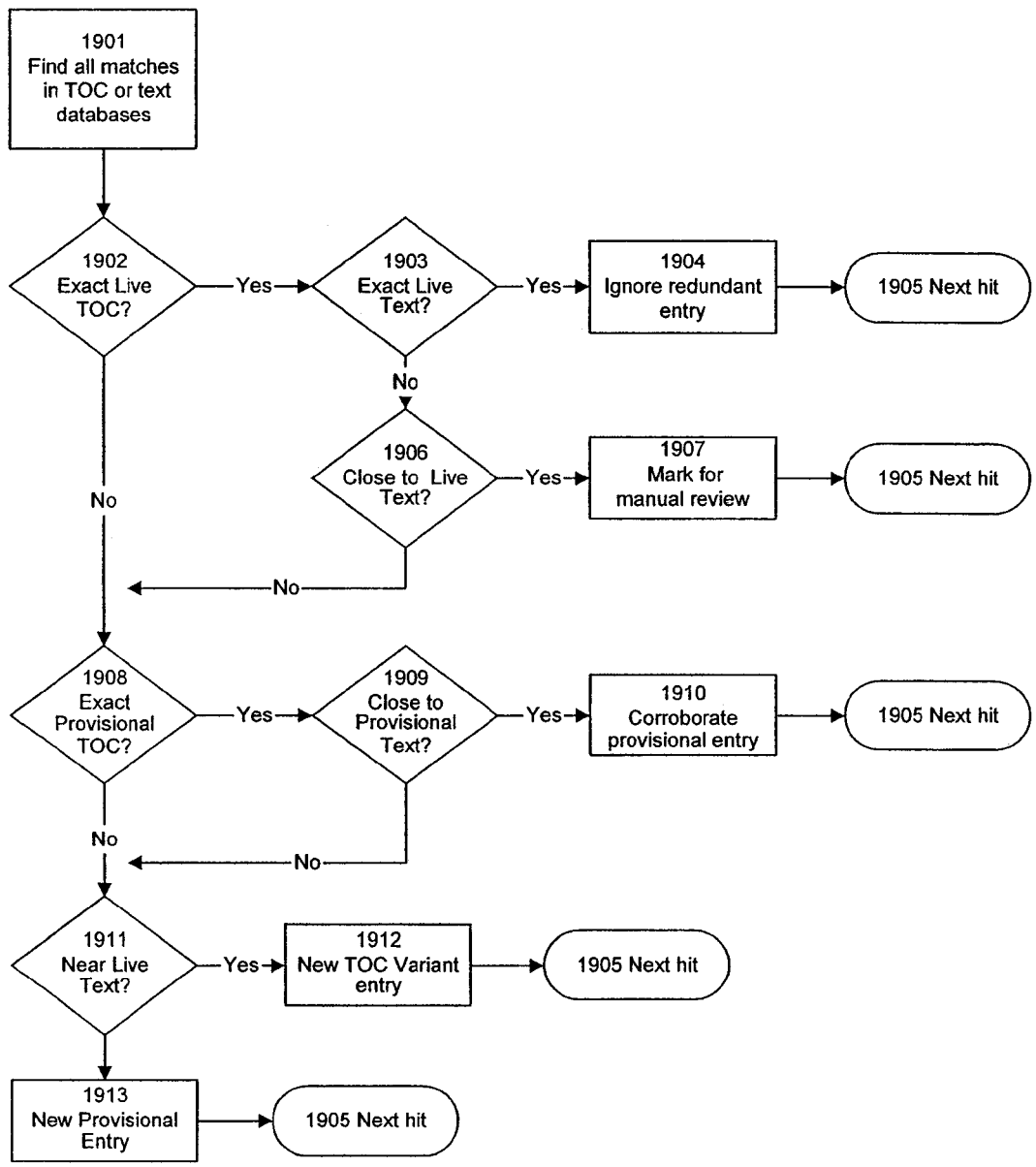
FIG. 19 is a flowchart depicting a method of handling metadata submission according to one embodiment of the present invention.

User submissions 903 are sent to a submissions database 906 for processing by a submission processing module 904 according to the techniques of FIGS. 7 and 19.

Metadata Indexes 907

Metadata indexes 907 are constructed when metadata server 105 starts up. They are updated periodically as data is appended to user-entered metadata database 106A (based on new submissions). Multiple indexes 907 are created in order to define the search order of the metadata. The indexes are created, for example, by reading the contents of the commercial metadata database 106B and user-entered metadata database 106A. There may be multiple files for each of these sources corresponding to different commercial providers, different languages, or different levels of credibility for user-submitted data (corroborated and uncorroborated).

In one embodiment, two types of index 907 are created: a TOC index and a text index. A TOC index is created by reading the metadata files and creating a TOC vector for each TOC string that is encountered in the file, and associating it with the Disc ID of the associated record. The index can be created as a simple list of (TOC, Disc ID) object pairs. A scanning/retrieval operation is then performed, consisting of iterating through the list of TOCs in the index and performing a vector comparison with the query TOC. The scanning/retrieval operation returns the Disc IDs associated with the TOCs that compare most closely to the query.

The second type of index is a text- or word-based index that is used for artist/title text-based searches. This is a standard text-based information retrieval (IR) index that is well known in the art of text searching applications. The index consists of data structures that map the words found in the artist and album titles in metadata database 106 to the Disc IDs with which they are associated. A title query on the index consists of finding those Disc IDs that are associated with the most words matching the queries.

Other types of indexes can be built based on available linking data. For example, an audio signature index could be built that maps the combination of audio signature and position from which the signature was taken to Disc IDs.

Disc ID Format

In one embodiment, the Disc ID is an 8-digit hexadecimal number that is mapped to the metadata for a record. The most significant bit or bits are used to segment the ID space for multiple data sources. For example, a Disc ID having a most significant bit value of 1 might correspond to a record from commercial database 106B, while a record where the most significant bit value is 0 might correspond to a record from user-entered database 106A. In general, the Disc ID is opaque to client module 104 and server 105; the data source defines the Disc IDs, and client module 104 and server 105 use them with no knowledge of how they were generated.

The Disc ID encodes the byte offset of the desired record in the metadata file. Records are word- (16 bit) aligned, so that addresses are even. The least significant bit is used to indicate if the record should be returned from commercial metadata file 106B (lsb=0), or user-entered metdata file 106A (lsb=1). The Disc ID is opaque to the client.

Metadata File Format

The following is an example of a metadata file format for metadata files 106A and 106B. One skilled in the art will recognize that any file format may be used.

Metadata files 106A and 106B consists of CD metadata records. In one embodiment, the format of records in files 106A and 106B is compatible with the CDDB1 protocol response.

The comment header present in the XMCD files is not present in these records except for an optional revision number.

A line consisting of only a period '.' is used to separate multiple records.

In one embodiment, the Disc ID used in the file is not the CDDB1 ID, but rather a unique ID derived for each metadata record in a data source such that the ID space does not overlap with any other data source.

0+10+150+24948+50538+78725+92010+123080+
    155748+198053+211775+4519
DISCID=40460e60
DTITLE=Acid Jazz, Vol. 2
DARTIST=Various Artists
DYEAR=1995
DGENRE=Jazz
DARTID=396896
DALBUMID=396896
TTITLE0=Super Bad
TARTIST0=Idris Muhammad
TTRACKID0=8558080
TTITLE1=Cold Sweat
TARTIST1=Bernard "Pretty" Purdie
TTRACKID1=8558081
TTITLE2=Wildfire
TARTIST2=Rusty Bryant
TTRACKID2=8558082
TTITLE3=Hot Barbecue
TARTIST3=Jack McDuff
TTRACKID3=8558083
TTITLE4=Reelin' With the Feelin'
TARTIST4=Charles Kynard
TTRACKID4=8558084
TTITLE5=Spinky
TARTIST5=Charles Earland
TTRACKID5=8558085
TTITLE6=Who's Gonna Take the Weight?
TARTIST6=Melvin Sparks
TTRACKID6=8558086
TTITLE7=Mamblues
TARTIST7=Bernard "Pretty" Purdie/Cal Tjader
TTRACKID7=8558087
TTITLE8=The Twang Thang
TARTIST8=Billy Butler
TTRACKID8=8558088
TTITLE9=Haw Right Now
TARTIST9=Patrice Rushen
TTRACKID9=8558089

Detailed Metadata Service Architecture

Figure 16:
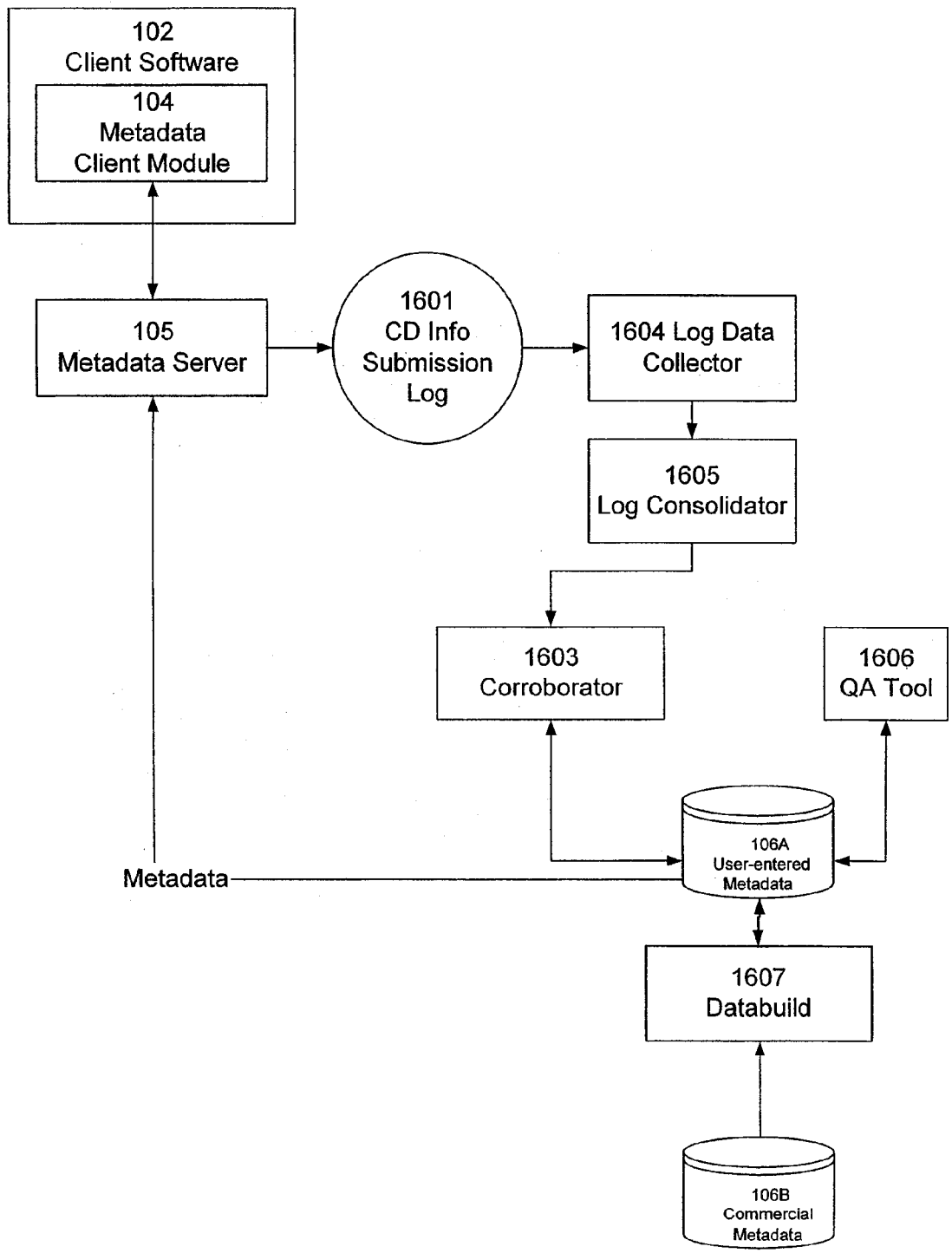
FIG. 16 is a block diagram depicting a detailed system architecture according to one embodiment of the present invention.

Referring now to FIG. 16, there is shown a block diagram of a detailed system architecture according to one embodiment of the present invention. As described above, client module 104 issues metadata queries, and transmits metadata submissions, to metadata server 105. FIG. 16 provides additional detail as to the processing of metadata submissions once they are received by server 105, according to one embodiment.

Upon receipt of a metadata submission, server 105 writes the submitted metadata to log file 1601. Log data collector 1604 filters and collects the log information from log file 1601, and periodically posts the data to log consolidator 1605. In embodiments where more than one metadata server 105 are provided, log consolidator 1605 consolidates events that have been processed on different servers 105. For example, consolidator 1605 accepts events from multiple log data collector 1604 instances, orders the events by user and time, and passes the events to corroborator 1603 in a convenient form.

Log consolidator 1605 transmits consolidated data to corroborator 1603, which determines whether submitted metadata has been corroborated by two or more independent sources. Corroborator 1603 publishes corroborated information to user-entered database 106A. If discrepancies are detected between submissions from two or more sources, corroborator 1603 identifies the discrepancies and, in one embodiment, provides a list of discrepancies to Quality Assurance (QA) tool 1606, for presentation to an administrator. In one embodiment, two or more user-entered databases 106A are provided: one for uncorroborated metadata, and one for corroborated metadata. In another embodiment, one database 106A is provided, and records are flagged to indicate whether the metadata they contain is corroborated or uncorroborated. As described above, server 105 favors corroborated metadata over uncorroborated metadata, so as to provide to client module 104 metadata of the highest possible level of credibility.

In one embodiment, Quality Assurance Tool 1606 is available to allow administrators to manually inspect and modify submission information that has been flagged for special attention. QA tool 1606 may provide, for example, a user interface that allows an editor to view submissions that conflict with previously stored metadata, or to examine other submissions that are flagged for manual review. The user interface of QA tool 1606 provides administrator controls for ignoring/deleting submissions, applying submissions to correct previously stored data, or defer action pending additional information. The user interface may also provide the administrator with the means to provide comments as appropriate.

Databuild module 1607 keeps the commercial database 106B in sync with user-entered database 106A. Databuild module 1607 processes updates to databases 106, and produces new metadata records for databases 106. Providers of commercial sources of data are constantly updating their data with new and corrected entries. The format of a commercial database may vary from one commercial source to another. Databuild module 1607 processes these updates in the vendor-specific formats. In one embodiment, databuild module 1607 consolidates the data from multiple feeds such that data for the same artist or album is indexed by a single, unique identifier regardless of which source provided the data. Databuild module 1607 also republishes the commercial data in the format described above for database 106B, that is suited for use by metadata server 105. As new data is published by the commercial providers and becomes available to the system, duplication between the commercial and user-submitted data may occur. Databuild module 1607 eliminates redundant entries from the user entered database 106A. Databuild module 1607 also merges approved corrections into databases 106, in accordance with the methods described below in connection with FIG. 19.

Log data collector 1604, log consolidator 1605, corroborator 1603, QA tool 1606, and databuild module 1607 may be implemented, for example, as software components of metadata ASP 103.

Referring now to FIGS. 17A, 17B, and 17C, there are shown diagrams depicting the software structure of one embodiment of server 105 in more detail. Referring now to FIG. 17A, there is shown the software objects in one embodiment of server 105, specifically an embodiment based on a Java servlet environment such as the Apache Tomcat environment. HttpServlet object 1701 accepts HTTP requests through the Tomcat or other servlet environment. This object is extended to handle the specific protocols described above. CDIIndex object 1702 manages the various types of metadata indexes 907. TocDB 1705 implements a TOC-based metadata index. Index 1706 implements a title (word) based index. CDIIndex 1702 uses an add( ) method to add new entries to the indexes (as it does on startup when it reads the metadata databases). CDIIndex 1702 uses find( ) to query the indexes using TOC or words as appropriates for the type of index. CDIDataStore 1703 encapsulates metadata databases 106A and 106B. Underlying this encapsulation is MappedByteBuffer object 1704 which provides access to the memory-mapped file implementation of databases 106.

Referring now to FIGS. 17B and 17C, there are shown the class inheritance relationships used in one embodiment of server 105. The various types of requests handled by server 105 are encapsulated by objects 1713, 1714, and 1715 in FIG. 17B. The various types of responses generated by server 105 are encapsulated by objects 1721, 1722, 1723, and 1724 in FIG. 17C.

Figure 18:
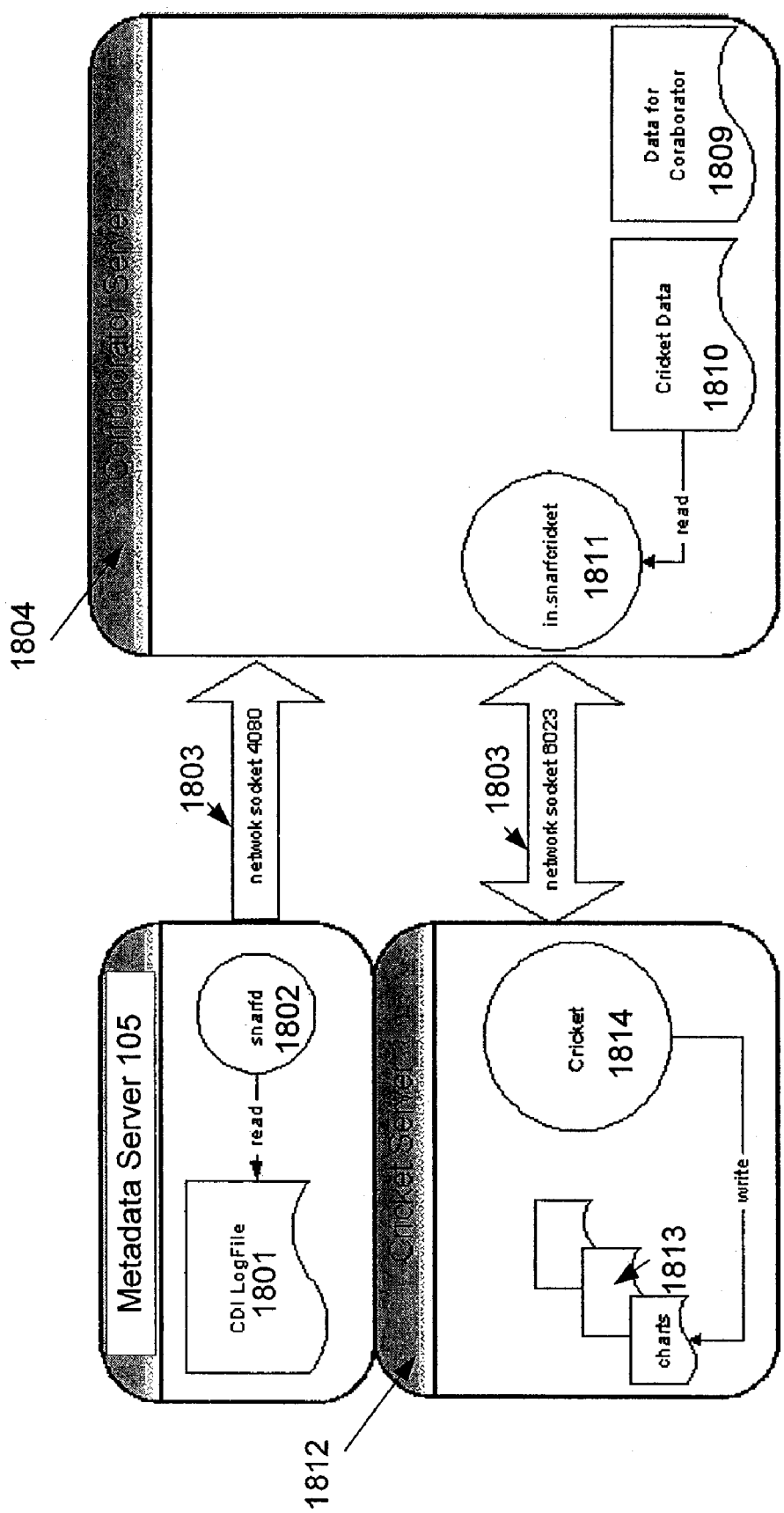
FIG. 18 is a block diagram depicting the operation of a log consolidator according to one embodiment of the present invention.

Referring now to FIG. 18, there is shown a block diagram depicting the operation of log consolidator 1605 in more detail. Server 105 produces log file 1801 from incoming submissions. There may be many instances of server 105 running on different machines. Each machine running a server 105 has a daemon program called snarfd 1802 which reads a log file as it is written and transmits the data over a network connection 1803 to Corroborator Server 1804, which stores the data 1809. Corroborator Server 1804 also maintains system monitoring statistics referred to as Cricket data 1810. Cricket is an OpenSource software package for monitoring and graphing. A daemon process in.snarfcricket 1811 reads the Cricket data periodically and posts the data to Cricket server 1812 which runs Cricket 1814 and maintains graphs 1813 of the system status.

Metadata Submission Method

Figure 1:
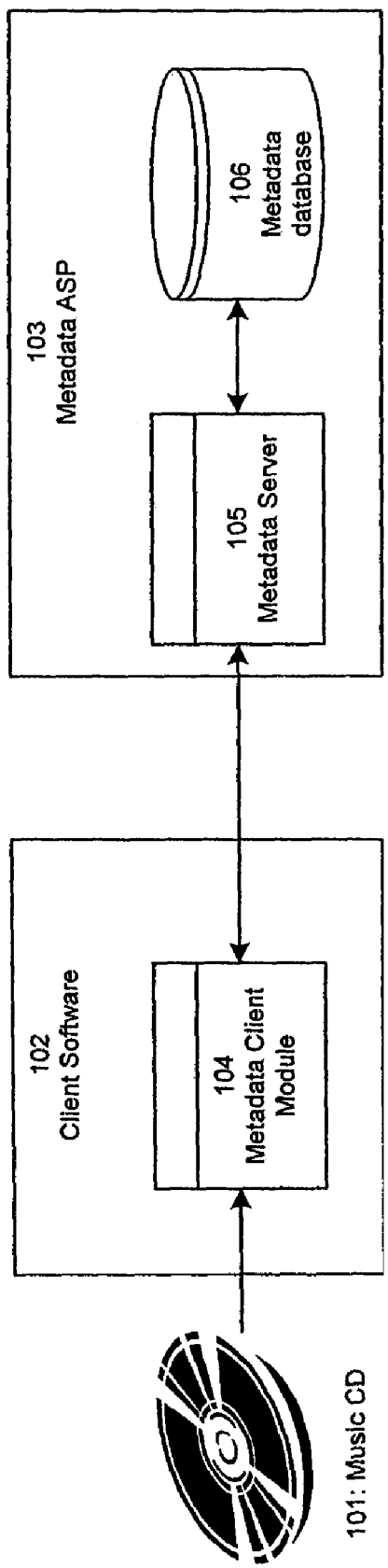
FIG. 1 is a block diagram depicting a system for obtaining metadata from a remote server according to the prior art.
Figure 2:
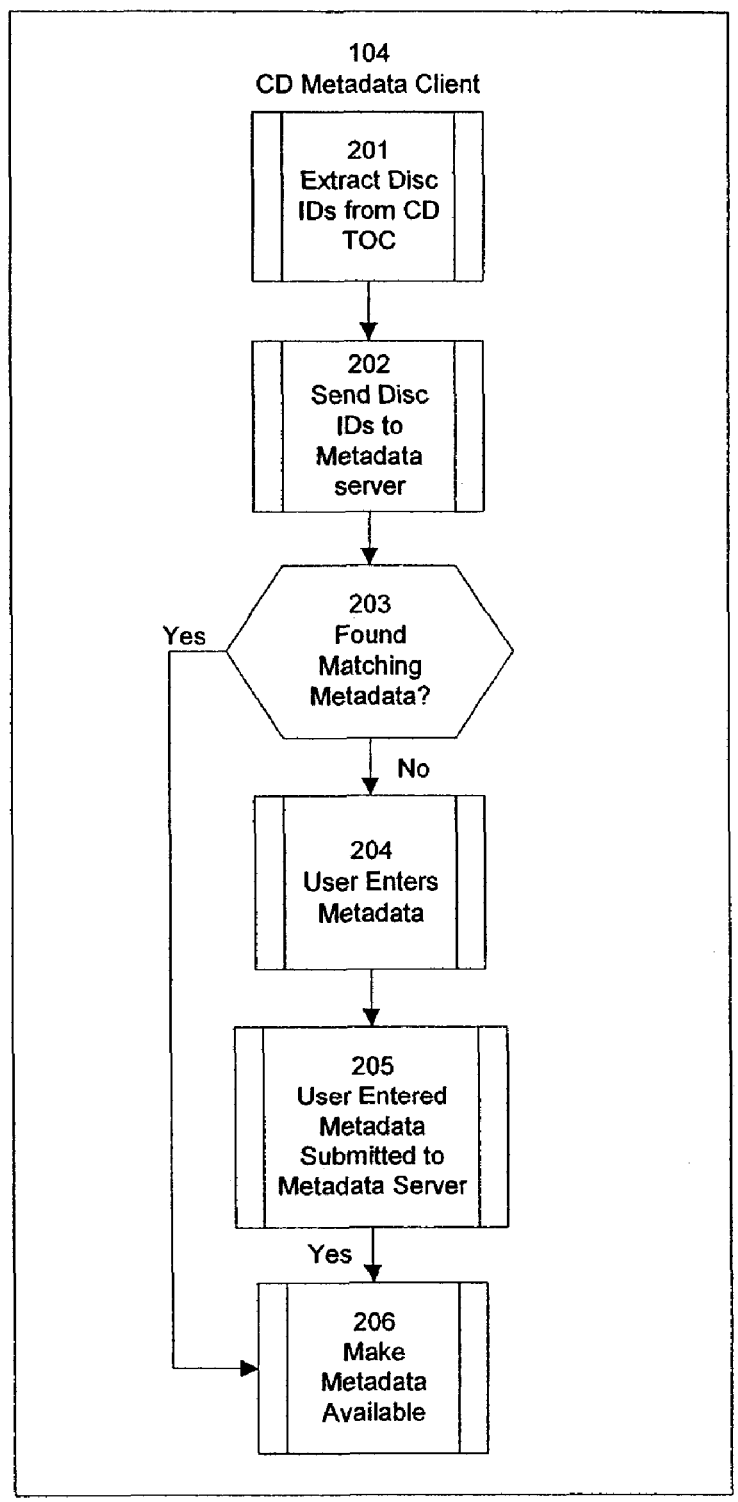
FIG. 2 is a flowchart depicting a client method for obtaining metadata from a remote server according to the prior art.
Figure 3:
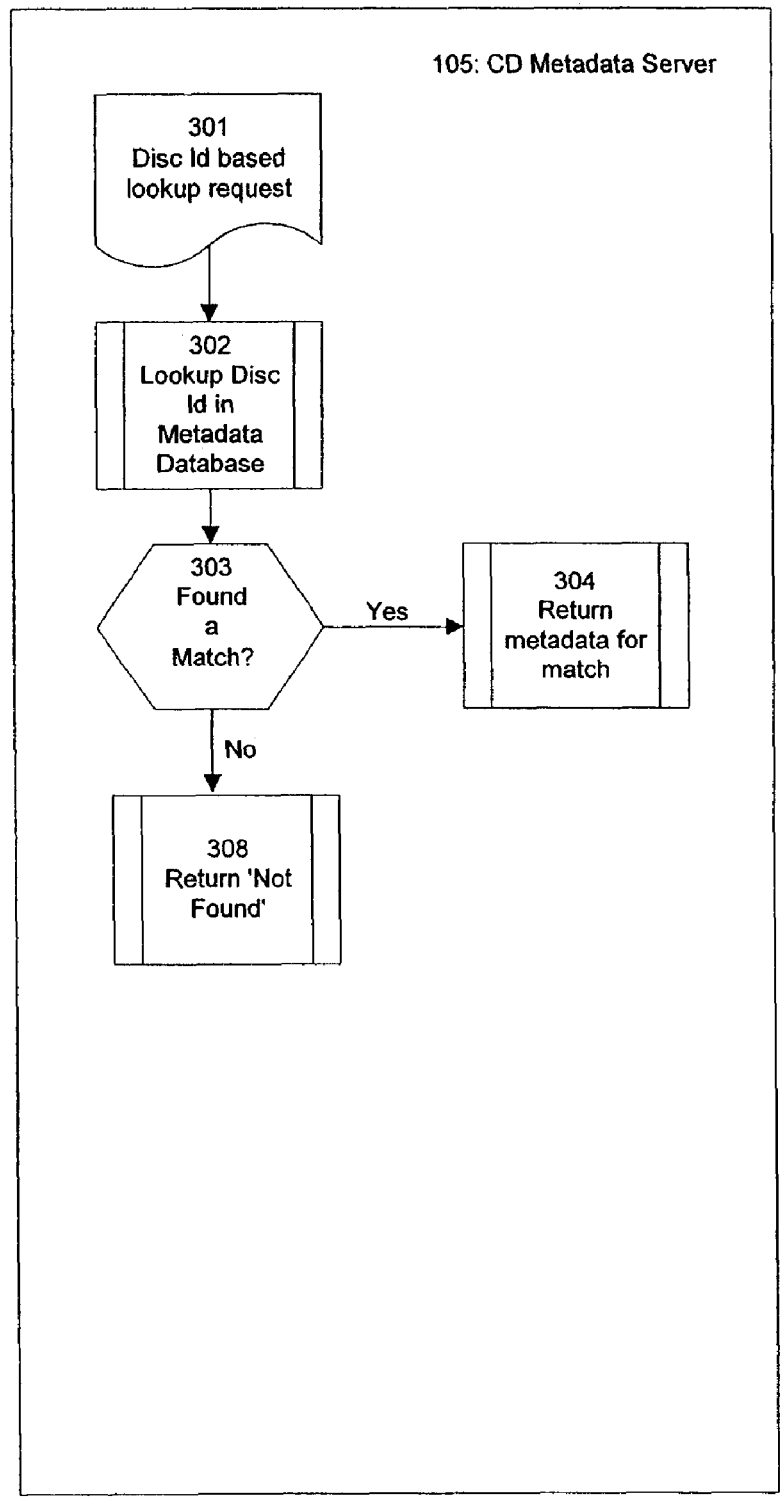
FIG. 3 is a flowchart depicting a server method for looking up metadata according to the prior art.
Figure 4:
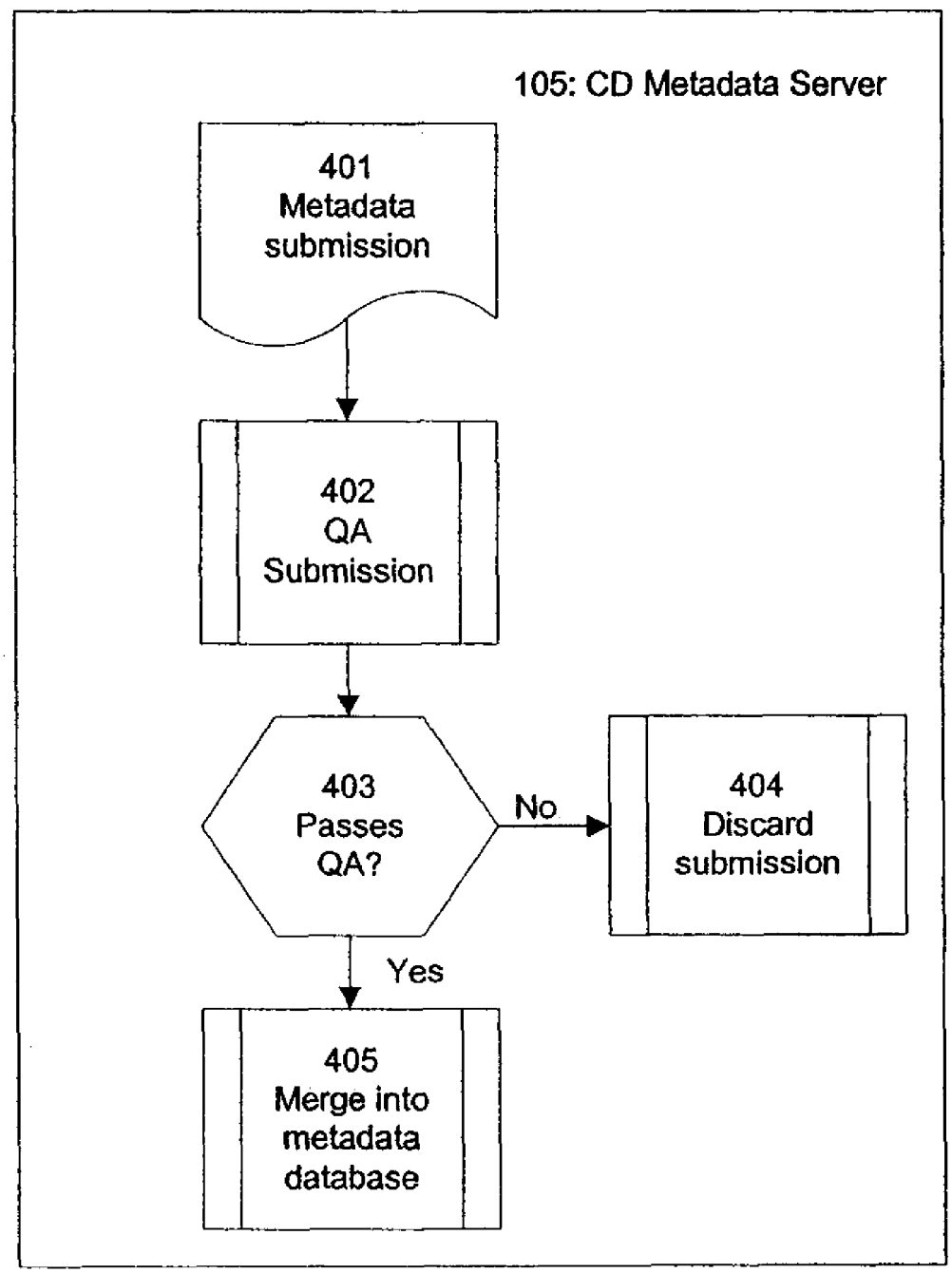
FIG. 4 is a flowchart depicting a server method for adding metadata information to a database, according to one embodiment of the present invention.

Referring now to FIG. 4, there is shown a flowchart depicting a server method for adding metadata information to database 106, according to one embodiment of the present invention. Server 105 receives 401 a submission request from client 102. Server 105 may perform 402 Quality Assurance on the submission, in order to check for completeness, spelling, case usage, and the like. If the submission passes QA 403, the new information is stored 405 in database 106. Submissions that do not pass the QA process are discarded 404.

Referring now to FIG. 19, there is shown a flowchart depicting a method of handling metadata submission according to another embodiment of the present invention. In one embodiment, the steps of FIG. 19 are performed by corroborator 1603; in another embodiment, they are performed by server 105 or some other component of the system. In one embodiment the steps of FIG. 19 are performed automatically when the user enters metadata for an inserted CD. In another embodiment, the steps are performed in a batch mode, after a number of submissions have been collected in log 1601 and are ready for processing.

In the flowchart of FIG. 19, and in the following description, the term "provisional" is used to indicate a database record that has not been corroborated, and the term "live" is used to indicate a database record that has been corroborated or is part of a commercial database.

First, the system of the invention performs searches on databases 106, to find 1901 matches both by TOC-based Disc ID for the inserted CD and by text on the user-entered information. A text search, in this case, compares the text comprising the metadata of a submission to existing entries in the databases 106. Specifically, the comparison seeks to determine if the submission contains the same track list, independent of punctuation, capitalization, or other insignificant differences. Users can submit information in a variety of ways, whether or not they entered the data or changed it. Small changes in punctuation or capitalization are ignored. Exact matches and approximate matches are identified, and the steps of FIG. 19 are performed for each.

If the TOC of the inserted CD exactly matches that of a live (corroborated) record 1902, and the user-submitted metadata exactly (or very closely) matches the metadata of the record 1903, the system ignores 1904 the submission as redundant. The system then proceeds 1905 to the next hit (if any).

If the TOC of the inserted CD exactly matches that of a live record 1902, and the user-submitted metadata is close to the metadata of the record 1906, the system marks 1907 the submission for manual review via QA tool 1606. The system then proceeds 1905 to the next hit (if any).

If the TOC of the inserted CD matches that of a provisional (uncorroborated) record 1908, and the user-submitted metadata matches or is close to the metadata of the provisional record 1906, the system upgrades 1910 the provisional record to live (corroborated) status. The system then proceeds 1905 to the next hit (if any).

If the user-submitted metadata matches or is close to the metadata of a live record 1911, the system creates 1912 a new provisional record indicating a TOC variant corresponding to the metadata of the live record. The system then proceeds 1905 to the next hit (if any). In some cases, a submission includes only a TOC and a matching Disc ID. This is a TOC variant submission and occurs, for example, when the user accepts the result of a text search 2010, as described above in connection with FIG. 21. In general, TOC variant submissions occur whenever a lookup succeeds (i.e., is accepted by the end user) and the lookup was a result of inexact TOC match or a non-TOC based metadata index 907.

Otherwise, the system creates 1913 a new provisional record including the user-submitted metadata of the live record. The system then proceeds 1905 to the next hit (if any).

In one embodiment, databases 106 are not updated in real time. Rather, all updates are performed on in-memory structures within consolidator 1605 (or other component), and databases 106 are periodically updated from the in-memory data.

The following table summaries the actions performed in the various contingencies depicted in FIG. 19:

|  |  | | | Prov Text | | | |
| --- | --- | --- | --- | --- | --- | --- | --- |
|  |  | Near/Exact | Miss | Miss Live Text | Near/Exact | Near/Exact | Miss |
| Prov TOC | Live TOC | Exact | Exact | Near | Near | Miss | Miss |
| Exact | Exact | A | A | B | B | C | D |
| Near/Miss | Exact | A | A | B | B | D | D |
| Near/Miss | Miss | E | E | E | E | D | D |
| Exact | Miss | C | E | E | C | C | D |

| Figure Code | Element | Condition | Comment |
| --- | --- | --- | --- |
| A | 1904 | Redundant data | Ignore; already in live database |
| B | 1907 | Redundant data | Manually review |
| C | 1910 | Corroboration | Additional data for provisional entry |
| D | 1913 | New Entry Altogether | Any TOC match is just misleading |
| E | 1912 | New TOC variant | Add to provisional database |

In one embodiment, provisional (uncorroborated) records are not promoted to live (corroborated) status until some degree of credibility for the record has been established. This may entail receiving some predetermined number of matching submissions, or some type of additional verification. In addition, some users may be deemed more credible than others, based on historical accuracy and number of submissions or on other factors; a corroboration "score" may be developed for each provisional record, based on the number of corroborating submissions and/or the relative credibility of the users that provided the submissions. Score can depend on various factors, for example: whether the provisional and corroborating submissions were submitted by different users; whether the provisional and corroborating submissions came from different network (e.g. IP) addresses; whether the submissions came from users that have abused the system in the past.

Records may be promoted to live status when their score exceeds a threshold. In one embodiment, the number of corroborating submissions necessary for promotion can be predetermined, or can be varied based on, for example, whether the submission conflicts with an existing popular entry in the database.

System Operation

In one embodiment, the system of the present invention is further extended to allow retrieval of data from a commercial database 106B even if TOC data is not present.

For example, if TOC data is not available, the user can manually enter descriptive information about a CD (such as artist and album name). Server 105 searches for and retrieves matching records in databases 106A and 106B. Client software 102 then prompts the user to confirm whether or not the retrieved records are the correct records. Upon user confirmation, an association can be made between a TOC that was previously associated with the matching records in database 106A and 106B, and the user-entered information. Subsequent TOC searches would then return the metadata for the album directly. In one embodiment, the user-entered information must be corroborated before it is made available as live metadata.

Alternatively, the present invention can be combined with an audio signature algorithm that matches audio signal data. Audio signatures for CD tracks can be associated with the album metadata in databases 106A and 106B. Server 105 can make such associations any time metadata and TOC data are or become known but audio signatures are not known in the central database. Thus, if a TOC search finds the album, the audio signatures for the tracks in the search can be added to album metadata. If an album and artist name search is used to associate TOC data with metadata, then the audio signatures can be associated at the same time.

Figure 22:
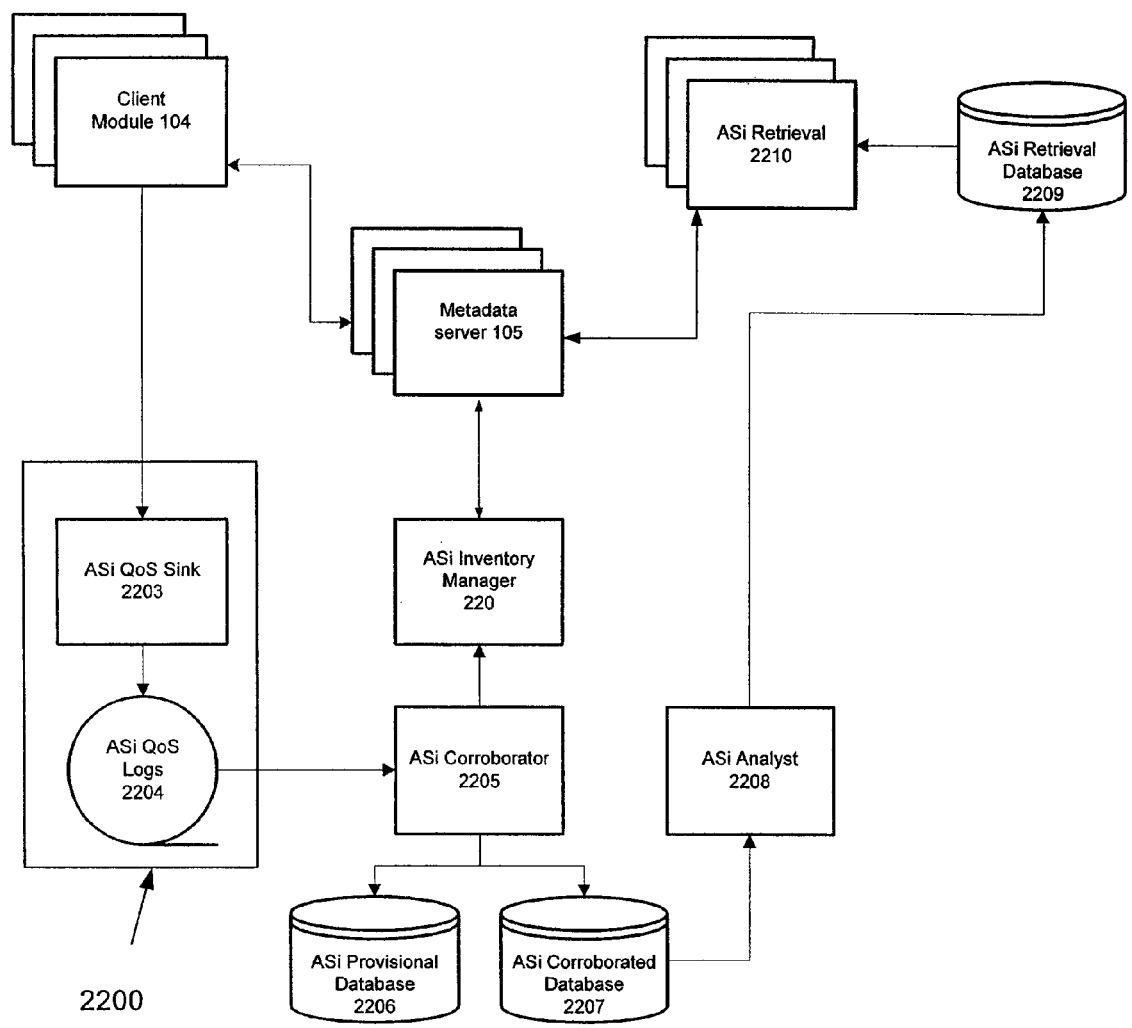
FIG. 22 is a block diagram of system operation in connection audio signatures, according to one embodiment of the invention.

Referring now to FIG. 22, there is shown a block diagram of system operation in connection with audio signatures, according to one embodiment of the invention.

Client module 104 issues CD lookup queries to the metadata server 105. Metadata server 105 looks for query results, and in the case of a match, communicates the set of tracks available for ASi reference signature collection to ASi Inventory Manager 2202. ASi Inventory Manager 2202 responds with zero, one, or more tracks for which reference signatures should be collected. Metadata server 105 annotates the response with an indicator to client module 104 of the track(s) for which signatures should be collected. Client module 104 collects the requested signatures, for example during a rip operation, and logs them, for example, using a Quality of Service (QoS) logging subsystem 2200. QoS logging subsystem 2200 uploads the collected signatures to sink 2203. Sink 2203 receives and stores uploaded log files 2204.

ASi Corroborator 2205 processes logs as they are received. ASi Corroborator 2205 classifies the received data as either provisional or corroborated and stores the data in the appropriate database 2206 or 2207. ASi Corroborator 2205 also notifies ASi Inventory Manager 2202 that a signature was received. ASi Inventory Manager 2202 updates its inventory of received signatures.

Periodically, ASi Analyst 2208 analyzes the collected signatures. ASi Analyst 2208 transforms the reference signatures from databases 2206 and 2207 into a format suitable for doing ASi retrieval, and stores the result in database 2209. When module 104 transmits a query request, an audio signature may be passed as part of the request. Server 105 passes the signature to ASi Retrieval server 2210 to find matching tracks for the signature in database 2209. Server 105 consolidates the results and returns them to client module 104.

Subsequently, when a track from a known album is encountered that has either non-standard or non-existent metadata tags, it can be recognized using the audio signature. In addition, results from the TOC search can be disambiguated using the audio signatures as they are associated with albums.

Alternatively, as tracks with non-standard tagging are encountered, if they can be identified using an audio signature, then the non-standard tags can be recorded and associated with the album. Subsequently, when data is acquired by other means when only the non-standard tag is available and the audio signature is not available, the track can still be identified accurately. In one embodiment, this association between tracks is done by semi-automated means. In some instances, only artist and track names may be available (as in the file names for tracks distributed by peer-to-peer services). If, however, a track with identical tags has previously been identified using audio signatures, then the presence of identical tags can be taken as strong evidence about the identity of the track. The result is that the current semi-automated track tag equivalencing process can be fully automated. This makes the input data for recommendation engines much more useful because the data can be referenced back to rich data sources which associate primary artists, other performers, albums, and tracks.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct a more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A method of retrieving metadata associated with a media item, comprising:
   obtaining, by at least one processing unit, a plurality of numeric values of the media item;
   forming, by the at least one processing unit, a query from the plurality of numeric values;
   running, by the at least one processing unit, the query on a metadata source comprising a plurality of records comprising metadata;
   responsive to a plurality of records matching the query, the at least one processing unit:
      prompting a user to select one of the matching records;
      receiving user input selecting one of the matching records; and
      outputting at least a portion of the metadata from the selected record;
   responsive to a single record matching the query, the at least one processing unit:
      outputting at least a portion of the metadata from the matching record; and responsive to no records matching the query, the at least one processing unit:
      prompting the user to provide at least one search parameter;
      forming a second query from the provided at least one search parameter;
      running the second query on the metadata source to retrieve at least one record comprising metadata; and
      outputting at least a portion of the metadata from the at least one record.

2. The method of claim 1, further comprising:
   prompting the user to edit the output metadata; and
   responsive to receiving edited metadata from the user, submitting the edits for updating the metadata source.

3. A metadata retrieval system, comprising:
   a media item reader, for retrieving, from a media item, a plurality of numeric values;
   a metadata source, comprising a plurality of records comprising metadata;
   a database query engine, coupled to the media item reader and to the metadata source, for running at least one database query based on the plurality of numeric values;
   a user interface module, coupled to the database query engine, for:
      responsive to a plurality of records matching the query:
         prompting a user to select one of the matching records; and
         receiving user input selecting one of the matching records; and responsive to no records matching the query:
         prompting the user to provide at least one search parameter; and
         receiving user input specifying at least one search parameter; and
   an output device, coupled to the database query engine, for outputting at least a portion of the metadata from a matching record;
   wherein, responsive to no records matching the query, the database query engine runs a second query on the metadata source to retrieve at least one record comprising metadata using the at least one search parameter specified by the user input.

* * * * *